US010055688B2

United States Patent
Moon et al.

(10) Patent No.: US 10,055,688 B2
(45) Date of Patent: Aug. 21, 2018

(54) CONTEXT BASED SERVICE TECHNOLOGY

(71) Applicant: Korea Electronics Technology Institute, Seongnam-si, Gyeonggi-do (KR)

(72) Inventors: Jae Won Moon, Seoul (KR); TaeBeom Lim, Yongin-si (KR); KyungWon Kim, Seoul (KR); SeungWoo Kum, Yongin-si (KR); JongBin Park, Hwaseong-si (KR); JongJin Jung, Incheon (KR)

(73) Assignee: Korea Electronics Technology Institute, Seongnam-si (KR)

( * ) Notice: Subject to any disclaimer, the term of this patent is extended or adjusted under 35 U.S.C. 154(b) by 437 days.

(21) Appl. No.: 14/485,934

(22) Filed: Sep. 15, 2014

(65) Prior Publication Data
US 2015/0278696 A1    Oct. 1, 2015

(30) Foreign Application Priority Data

Mar. 27, 2014  (KR) .................. 10-2014-0036057

(51) Int. Cl.
*G06N 5/04*     (2006.01)
*G06Q 10/06*    (2012.01)
(Continued)

(52) U.S. Cl.
CPC .......... *G06N 5/045* (2013.01); *G06Q 10/067* (2013.01); *G06Q 10/0637* (2013.01);
(Continued)

(58) Field of Classification Search
CPC ............ G06N 5/045; G06N 5/02; G06N 5/04; G06Q 10/063112; G06Q 10/0637;
(Continued)

(56) References Cited

U.S. PATENT DOCUMENTS

2008/0243637 A1* 10/2008 Chan ..................... G06Q 30/02
                                                      705/26.1
2009/0063372 A1*  3/2009 Lu .......................... H04L 67/22
                                                       706/11
(Continued)

FOREIGN PATENT DOCUMENTS

| KR | 1020110062896 | 6/2011 |
|----|---------------|--------|
| KR | 10-20120050967 A | 5/2012 |
| KR | 10-13518180000 B1 | 1/2014 |

OTHER PUBLICATIONS

Hong et al., "Context-aware system for proactive personalized service based on context history", Expert Systems with Applications, 36, 2009, pp. 7448-7457.*

(Continued)

*Primary Examiner* — Dave Misir
(74) *Attorney, Agent, or Firm* — Sughrue Mion, PLLC

(57) ABSTRACT

A method for receiving a context based service includes: providing a user identifier (ID) to a service provider, the user ID being used for a recommendation of a service by a recommendation engine using a decision model; and receiving a recommended service from the service provider, the recommended service being recommended through a recommendation description (RD), the RD determined by the recommendation engine based on the decision model and at least one of a user description (UD) and a context description (CD) being obtained through the user ID.

15 Claims, 5 Drawing Sheets

(51) Int. Cl.
*G06Q 30/02* (2012.01)
*G06Q 50/00* (2012.01)

(52) U.S. Cl.
CPC ..... *G06Q 10/063112* (2013.01); *G06Q 30/02* (2013.01); *G06Q 50/01* (2013.01)

(58) Field of Classification Search
CPC ...... G06Q 10/067; G06Q 30/02; G06Q 50/01; G06F 17/2785; G06F 17/30029
USPC .......................................................... 706/46
See application file for complete search history.

(56) References Cited

U.S. PATENT DOCUMENTS

| | | | | |
|---|---|---|---|---|
| 2010/0042932 A1* | 2/2010 | Lehtiniemi | ............ | G06Q 30/02 715/747 |
| 2010/0257131 A1* | 10/2010 | Kim | ............ | G06Q 30/02 706/47 |
| 2010/0312724 A1* | 12/2010 | Pinckney | ............ | G06N 99/005 706/11 |
| 2011/0131077 A1* | 6/2011 | Tan | ............ | G06Q 30/02 705/7.29 |
| 2011/0307478 A1* | 12/2011 | Pinckney | ............ | G06N 99/005 707/724 |
| 2012/0054065 A1* | 3/2012 | Sung | ............ | G06Q 30/0631 705/26.7 |
| 2012/0150642 A1* | 6/2012 | Kandanala | ............ | G06Q 30/02 705/14.53 |
| 2012/0166377 A1* | 6/2012 | Sathish | ............ | G06Q 10/00 706/47 |
| 2013/0018954 A1* | 1/2013 | Cheng | ............ | G06Q 10/00 709/204 |
| 2013/0124449 A1* | 5/2013 | Pinckney | ............ | G06F 17/30867 706/52 |
| 2013/0159234 A1* | 6/2013 | Xing | ............ | H04M 1/72569 706/46 |
| 2013/0290339 A1* | 10/2013 | LuVogt | ............ | G06F 17/30867 707/740 |

OTHER PUBLICATIONS

Jung J. "Contextualized mobile recommendation service based on interactive social network discovered from mobile users", Expert Systems with Applications, 36, 2009, pp. 11950-11956.*
Oh et al., "The method for resurrecting the contents which is suitable for the current situation of the mobile communication terminal", KR1020090003375, Jan. 12, 2009.*
Myaeng et al., "Local information searching apparatus and method", KR1020110062896, Jun. 10, 2011.*
Sohn et al., "Decision making recommendation system and method", KR1020120118400, Oct. 26, 2012.*
Chang et al., "The decision making tree device and the website for providing the information", KR1020100052495, May 19, 2010.*
Recommender System using Context Information and Spatial Data Mining; vol. 32, No. 2, Bae-Hee Le and Geun-Sik Jo, School of Computer Science & Engineering, Inha University, with partial English translation.

* cited by examiner

CONTEXT BASED SERVICE TECHNOLOGY

CROSS-REFERENCE TO THE RELATED APPLICATION

This application claims priority under 35 U.S.C. § 119 from Korean Patent Application No. 10-2014-0036057 filed on Mar. 27, 2014 the disclosure of which is incorporated herein in its entirety by reference.

BACKGROUND

1. Field

Methods consistent with exemplary embodiments of the inventive concept relate to a context based service, more particularly to a method for determining a context based service, a method for receiving the same, a method for providing the same and a method for generating the same for supporting a provision of a decision model based recommendation service.

2. Description of the Related Art

An information flood as big data requires a recommendation system for a user's quick and wise choice. This recommendation system may be used to provide a news service or a video service to a targeted user.

If such recommendation system is independently built through a service provider's interface, a third party's free competition for a recommendation service provision may be prevented. For example, if a recommendation system is independently built by a television (TV) production company or a TV program provider, a user may not receive a recommendation service through a third party's recommendation service but may receive a TV program recommendation intended by the TV production company or the TV program provider.

Korean Patent Publication No. 10-2009-0003375 relates to a method for generating contents suitable for a current situation of a mobile communications terminal in order to improve the reliability and satisfaction contents being provided to share a special condition of the mobile communication terminal by sharing the special condition with other users.

According to Korean Patent Publication No. 10-2013-0009922, a situation recognition user feeling interest model is provided to supply user experience which is not supplied in a Social Network Service (SNS) by supplying an optimum recommendation through the situation recognition user feeling interest model.

SUMMARY

One or more exemplary embodiments of the inventive concept provide a context based service technology capable of supporting a provision of a decision model based a recommended service.

One or more exemplary embodiments of the inventive concept provide a context based service technology capable of using a decision model including a decision tree where the decision tree may determine a user type for a recommendation of a service suitable for a user.

One or more exemplary embodiments of the inventive concept provide a context based service technology capable of using a decision tree where the decision tree determines a user type through at least one of a user description (UD) and a context description (CD).

According to an aspect of an exemplary embodiment, there is provided a method for receiving a context based service which may include: providing a user identifier (ID) to a service provider, the user ID being used for a recommendation of a service by a recommendation engine using a decision model; and receiving a recommended service from the service provider, the recommended service being recommended through a recommendation description (RD), the RD determined by the recommendation engine based on the decision model and at least one of a UD and a CD being obtained through the user ID. The user ID may be provided from a user terminal to a service engine before the user ID is provided to the service provider, and the recommended service may be determined based on a service description (SD) which is provided by the service engine and includes the decision model. The recommended service may be one of services that are provided by the service engine.

The decision model may include a decision tree used by the recommendation engine and representing a specific user type. The decision model may be used by the recommendation engine and may represent a set of user types classified for a service strategy. The decision model may be predefined by the service provider and may define a user type included in the RD.

According to an aspect of an exemplary embodiment, there is provided a method for providing a context based service which may include: preparing a decision model, the decision model being used for a recommendation of a service by a recommendation engine; and providing a recommended service to a user terminal when the recommendation of the service is requested from the user terminal, the recommendation service being recommended through an RD determined by the recommendation engine based on the decision model and at least one of a UD and a CD being obtained through a user ID.

The providing the recommendation service to the user terminal may include: receiving the user ID from the user terminal; providing the user ID and the decision model to the recommendation engine; and providing the RD to the user terminal by the recommendation engine based on the decision model and at least one of the user description and the context description, wherein the RD includes a user type in the decision model.

The providing the recommended service to the user terminal may further include supporting a determination of the user type by the recommendation engine according to a decision tree of the decision model. The providing the recommended service to the user terminal may further include checking whether the recommendation engine already has the decision model when the decision model is provided to the recommendation engine.

The providing the recommended service to the user terminal may include determining a recommended service provided to the user terminal based on the RD.

According to an aspect of an exemplary embodiment, there is provided a method for generating a context based service which may include: receiving a decision model used for determining a service to be provided from a service engine; and generating an RD based on the decision model and at least one of a UD and a CD.

The generating the RD may include analyzing a decision tree in the decision model based on at least one of the UD and the CD to infer a user type. The generating the RD may further include including the user type in the RD.

The generating the RD may include deducing at least one of the UD and the CD through a user context provided by a user terminal.

The generating the RD may include providing at least one of the UD and the CD from a user-context description provider through a user ID.

According to an aspect of an exemplary embodiment, there is provided a method for determining a context based service which may include: defining a set of user type including a plurality of user types classified when a service is determined; defining a decision model to be used for determining one of the plurality of the user types through at least one of a user description and a context description; and defining the decision model including the set of user type and a decision tree.

The context based service technology and related technologies according to an exemplary embodiment may support a provision of a decision model based recommended service.

The context based service technology and related technologies according to an exemplary embodiment may use a decision model including a decision tree where the decision tree may determine a user type for a recommendation of a service suitable for a user.

The context based service technology and related technologies according to an exemplary embodiment may use a decision tree where the decision tree determines a user type through at least one of a UD and a CD.

DETAILED DESCRIPTION OF THE EXEMPLARY EMBODIMENTS

Figure 1:
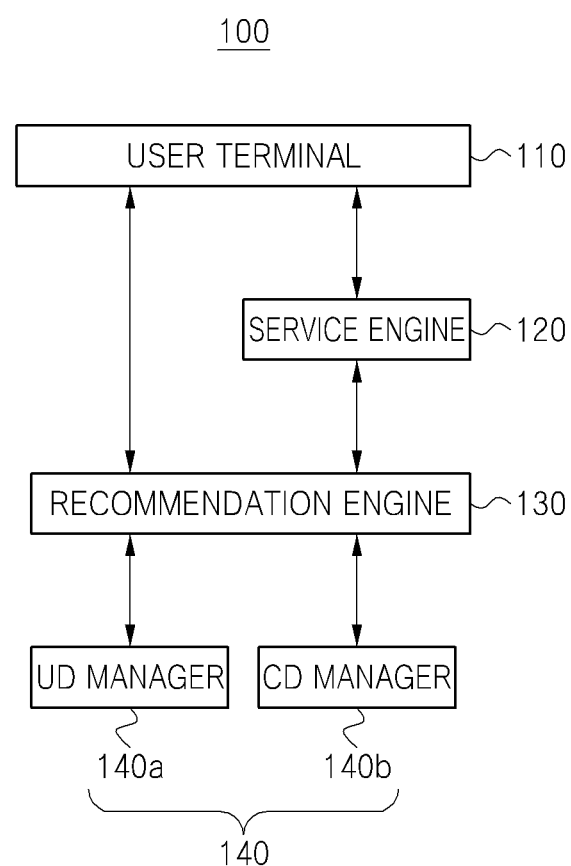
FIG. 1 is a diagram illustrating a context based service system according to an exemplary embodiment.

The inventive concept is explained through various exemplary embodiments. However, the scope of the inventive concept should not be construed to be limited to the embodiments explained herein. That is, since the embodiments may be implemented in several forms without departing from the characteristics of the inventive concept, it should also be understood that the inventive concept is not limited by any of the details of the following descriptions, unless otherwise specified, but rather should be construed broadly within its scope as defined in the appended claims. Therefore, various changes and modifications that fall within the scope of the inventive concept, or equivalents to such scope are therefore intended to be embraced by the appended claims.

Terms described in the present disclosure may be understood as follows.

While terms such as "first" and "second," etc., may be used to describe various components, such components must not be understood as being limited to the above terms. The above terms are used to distinguish one component from another. For example, a first component may be referred to as a second component without departing from the scope of rights of the inventive concept, and likewise a second component may be referred to as a first component.

The term "and/or" should be understood as including all of combination that can be made from one or more relevant items. For example, the term "the first item, the second item, and/or the third item" means not only the first, the second, or the third item, but the combination of all of items that can be made from two or more of the first, second, or third items.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "between", "immediately between" or "adjacent to" and "directly adjacent to" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps are used for the sake of explanation and do not describe an order of respective steps. The respective steps may be changed from a mentioned order unless specifically mentioned in context. Namely, respective steps may be performed in the same order as described, may be substantially simultaneously performed, or may be performed in reverse order.

The inventive concept may be implemented as machine-readable codes on a machine-readable medium. The machine-readable medium includes any type of recording device for storing machine-readable data. Examples of the machine-readable recording medium include a read-only memory (ROM), a random access memory (RAM), a compact disk-read only memory (CD-ROM), a magnetic tape, a floppy disk, and optical data storage. The medium may also be carrier waves (e.g., Internet transmission). The computer-readable recording medium may be distributed among networked machine systems which store and execute machine-readable codes in a de-centralized manner.

The terms used in the embodiments described herebelow are merely used to describe particular embodiments, and are not intended to limit the inventive concept. Unless otherwise defined, all terms used herein, including technical or scientific terms, have the same meanings as those generally understood by those with ordinary knowledge in the field of art to which the embodiments belong. Such terms as those defined in a generally used dictionary are to be interpreted to have the meanings equal to the contextual meanings in the relevant field of art, and are not to be interpreted to have ideal or excessively formal meanings unless clearly defined in the embodiments.

FIG. 1 is a diagram illustrating a context based service system according to an exemplary embodiment.

Referring to FIG. 1, the context based service system 100 includes a user terminal 110, a service engine 120, a recommendation engine 130 and a manager 140.

The user terminal 110 (i.e., a service client) corresponds to a computing device where the computing device requests a recommended service or receives the recommended service for a service from the recommendation engine 130.

The services may include any Independent, value-added operation, which brings values to a user, or applications providing benefits responding to the user's needs. Also, the application may include an entity in charge of responding to the users' requests. For example, the user terminal 110 may correspond to a mobile terminal such as a smartphone, a tablet computer, a notebook computer or a desktop computer. According to an exemplary embodiment, the user terminal 110 may operate a user agent as a process for a recommendation of a service and may perform a communication with the recommendation engine 130 through the user agent.

The service engine 120 (i.e., a service provider) corresponds to a computing device providing a service to the user terminal 110. According to an exemplary embodiment, the service engine 120 may offer a providable service to the recommendation engine 130 and may provide the user terminal 130 with the recommended service determined by the recommendation engine 130 at a request of the user terminal 130. For example, the service engine 120 may be implemented as a server interlinking with the user terminal 110 and/or the recommendation engine 130.

The recommendation engine 130 (i.e., a service recommender) corresponds to a computing device recommending the recommended service suitable for the user among the services which are providable from the service engine 120. According to an exemplary embodiment, if a request from the user terminal 130 is received, the recommendation engine 130 may determine a context based service as the recommendation service or may determine a context inferred service as a recommended service. For example, the recommendation engine 130 may be implemented as a server linking with the user terminal 110, the service engine 120 and the manager 140.

The manager 140 (i.e., a description provider) includes a user description (UD) manager 140a and a context description (CD) manager 140b, and corresponds to a computing device supporting a context determination or a context inference by the recommendation engine 130. According to an exemplary embodiment, the manager 140 may correspond to the user terminal 110. The UD manager 140a may provide user information (e.g., a user name and contact) and the CD manager 140b may provide situation information (e.g., a position of the user terminal 110). Herein, the UD manager 140a and the CD manager 140b may be classified through a logical concept not a physical concept. Therefore, the UD manager 140a and the CD manager 140b may be implemented in a same or different computing devices.

Herebelow, interface regulations being used among the user terminal 110, the service engine 120, the recommendation engine 130 and the manager 140 in the context based service system 100 will be described. The interface regulations may be defined through a UD, a CD, a SD and a recommendation description (RD).

The UD may correspond to a set of descriptions or a set of data including user information such as an identity, an interaction, a preference and a security setting. Here, the user information may include at least one of dynamical information and static information. According to an exemplary embodiment, the UD may be defined by the UD manager 140a and may correspond to an interface being used when the UD manager 140a provides the user information to the recommendation engine 130. More detailed explanations associated with the UD will be described in <Appendix 1>.

The CD may correspond to a set of descriptions or a set of data including an environmental situation where the user device is in use or operated or the user is located. The CD may include a physical position and an environmental variable (e.g., a temperature, a humidity and a sound level). According to an exemplary embodiment, the CD may be defined by the CD manager 140b and may correspond to an interface being used when the CD manager 140b provides the environmental situation to the recommendation engine 130. More detailed explanations associated with the CD will be described in <Appendix 2>.

The service description (SD) may correspond to a set of descriptions or a set of data including information (e.g., a security setting) suitable for a service (or a set of sub services) provided to a final user application. According to an exemplary embodiment, the SD may be defined in the service engine 120 and may correspond to an interface being used when the service engine 120 determines a recommended service by the recommendation engine 130. More detailed explanations associated with the SD will be described in <Appendix 3>.

The RD may correspond to a set of recommended Information elements provided to the user terminal 110 or a set of recommendation data. This set may include a sub-set being extracted from at least one of the UD, CD and SD and metadata being associated with the sub-set. According to an exemplary embodiment, the user terminal 110 or the service engine 120 may process the RD to provide a final recommendation service to the user. More detailed explanations associated with the RD will be described in <Appendix 4>

Figure 3:
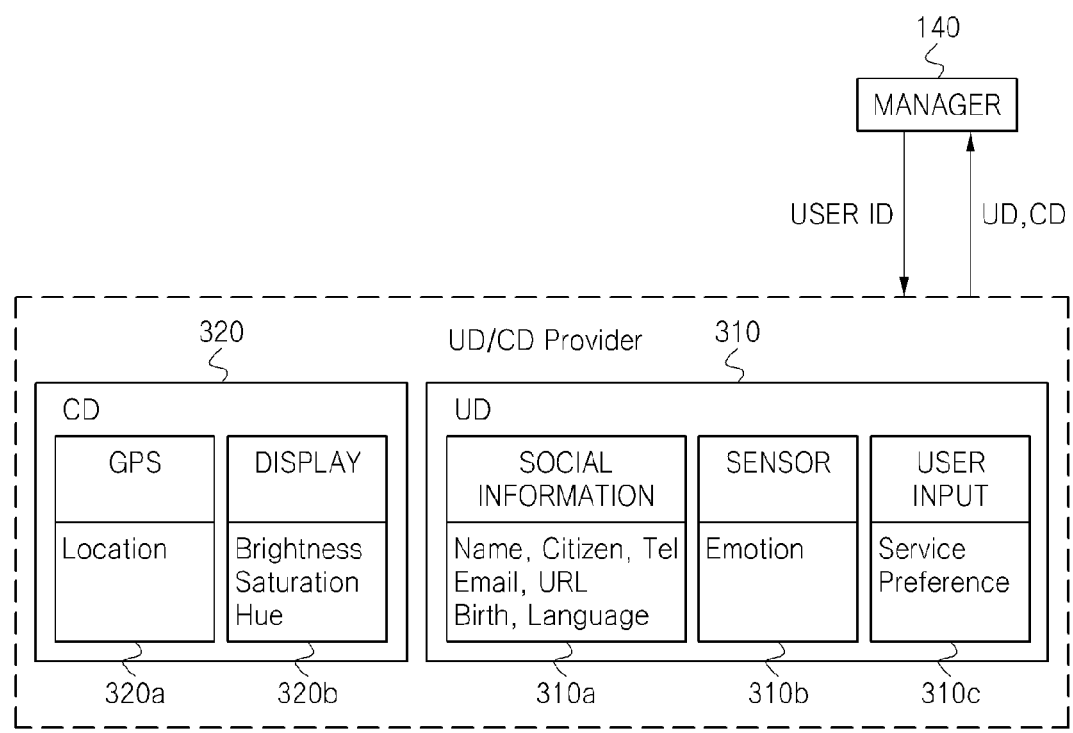
FIG. 3 is an exemplary embodiment diagram illustrating a user description (UD) and a context description (CD) managed by a manager in FIGS. 1 and 2.

For example, the UD and CD described above are illustrated in FIGS. 3 and 4. FIG. 3 illustrates the UD and CD managed by a manager and FIGS. 4A-4B illustrate representation describing the UD and CD, according to exemplary embodiments.

Figure 4A:
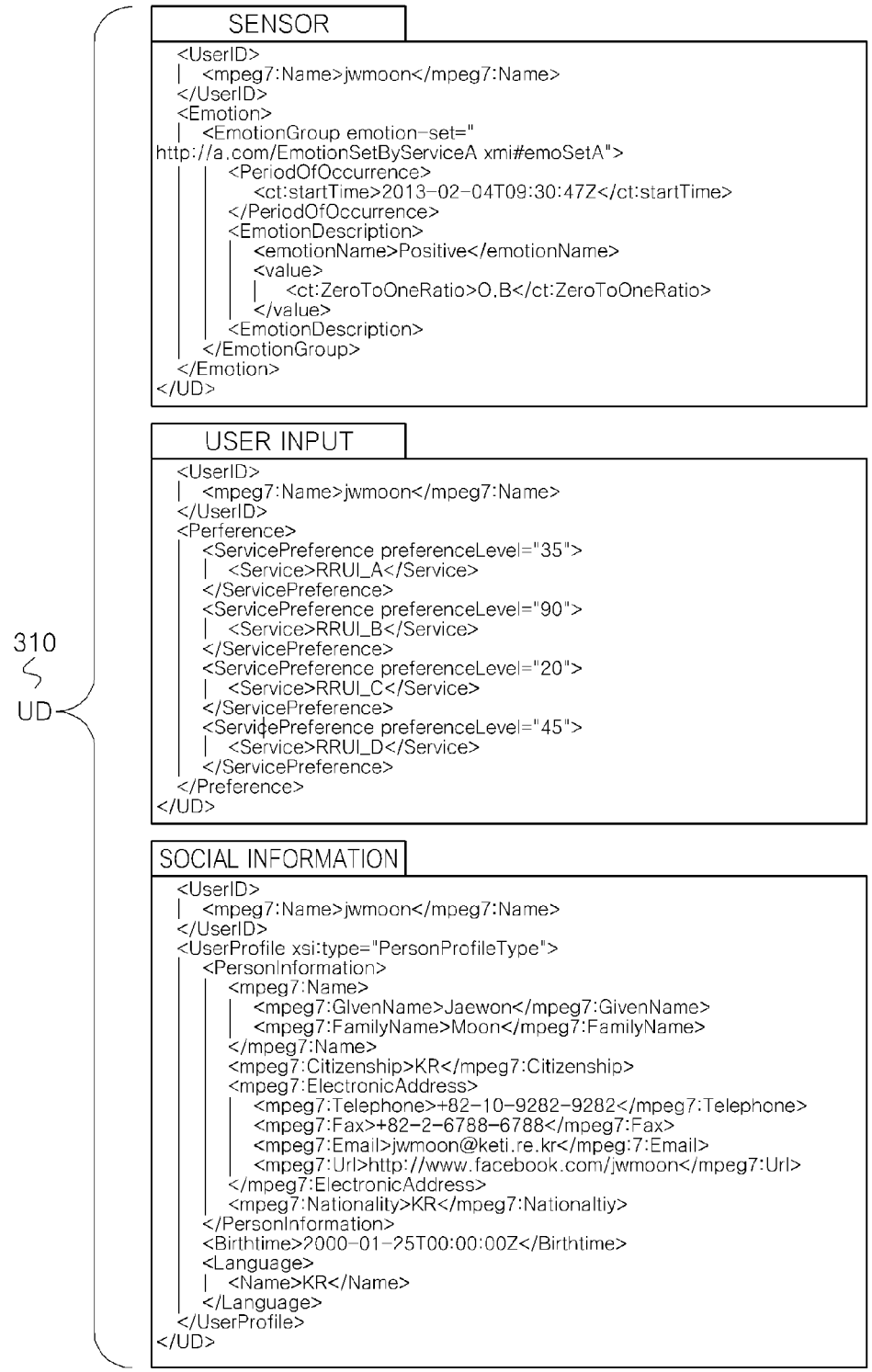
FIGS. 4A-4B are example representation diagrams illustrating a UD and a CD, according to exemplary embodiments.

Referring to FIG. 3 and FIG. 4A, a UD 310 may include social information 310a, sensor information 310b and user input information 310c. FIG. 4A will be explained in <Appendix 1> in more detail. The social information 310a may include information about a specific social site and for example, may include a name, a phone number, an email address, a birth date and a used language. The sensor information 310b may include an emotion inferred from sensing data obtained from the user; for example, a degree of an affirmation or an affirmation inferred based on a temperature and a pulse obtained through an wearable device attached to the user may be included. The user input information 310c may include a service preference inputted by the user; for example, a preference for a white color.

Figure 4B:
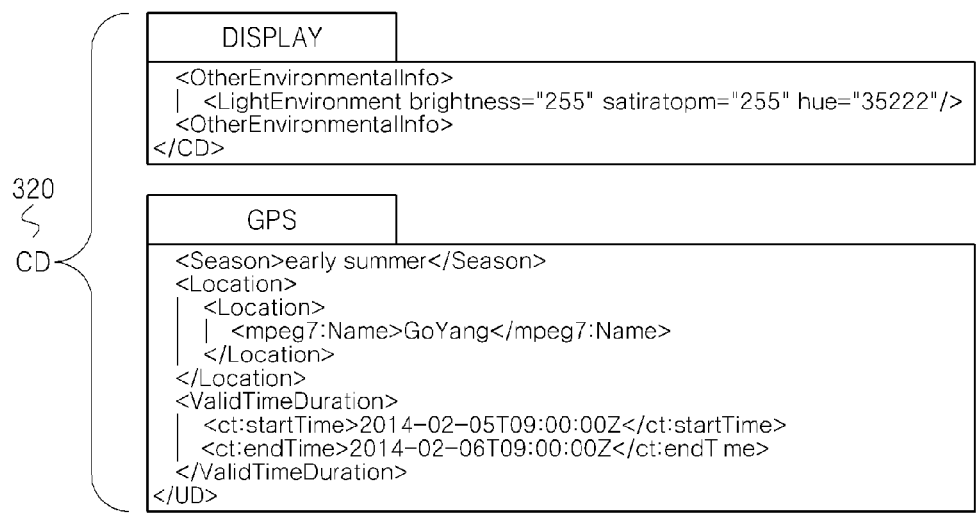

Referring to FIG. 3 and FIG. 4B, the CD 330 may include location information and display information. FIG. 4B will be explained in <Appendix 2> in more detail. The location information may be obtained through a Global Positioning System (GPS); For example, a current location of the user may be included in the CD. The display information may include a brightness, a saturation and a hue of the user terminal 110. For example, each of the rightness, the saturation and the hue may be represented by a percentage of the maximum value capable of being represented in the display device of the user terminal 110.

Figure 2:
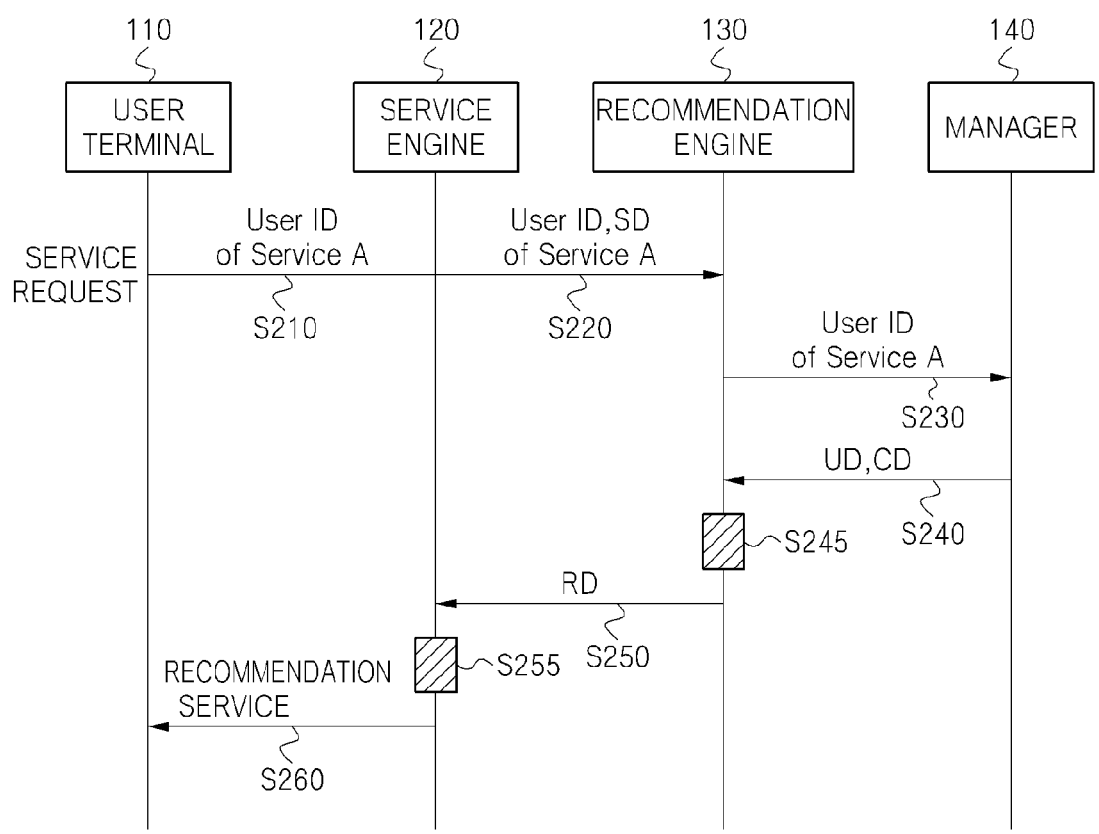
FIG. 2 is a flowchart illustrating a context based service system in FIG. 1, according to an exemplary embodiment.

FIG. 2 is a flow chart illustrating operations of a context based service system in FIG. 1, according to an exemplary embodiment.

In FIG. 2, it is assumed that each of the user terminal 110, the service engine 120, the recommendation engine 130 and the manager 140 is implemented as a separate computing device, and the UD manager 140a and the CD manager 140b are implemented as a same computing device. Also, it is assumed that the service engine 120 provides a service A (hereinafter, referred to a service) corresponding to an adaptive user interface service. The foregoing assumptions are provided merely according to an exemplary embodiment, and thus, the scope of the inventive concept should not be construed to be limited to the embodiment. Thus, according to another exemplary embodiment, the service engine 120 and the recommendation engine 130 may be implemented in a single computing device.

The user terminal 110 provides a user identifier (ID) for the service providing the adaptive user interface to the service engine 120 (Step S210). The user ID may be used for a recommendation by the recommendation engine 130, and may be implemented as a universal ID (e.g., a phone number) or an ID independently defined by the service engine 120 (e.g., a login ID being used by the service engine 120). In FIG. 2, when the adaptive user interface is to be recommended from the user, the user terminal 110 may request the service from the service engine 120 through the user identifier.

The service engine 120 may provide the service providing the adaptive user interface. Such service may correspond to one of any independent, value-added operations or applications or may be generated through a dynamic combination of a plurality of sub-services defined by the service engine 120. Also, such service may correspond to one of value-added operations and applications being brought from another external service provider.

The service engine 120 provides the user identifier provided from the user terminal 110 and the SD to the recommendation engine 130 (Step S220). The SD includes a decision model associated with the service provided from the service engine. As described in <Appendix 3>, the decision model includes a decision tree and a user type set. Here, the decision tree is used by the recommendation engine 130 and represents a user type, and the user type set includes a plurality of user types classified through a specific criterion.

Herebelow, the decision tree will be described.

The decision tree shows a representation for a user type required when a specific user type of a user type set is determined based on at least one of the UD and the CD (hereinafter, referred to a description).

According to an exemplary embodiment, the decision tree may include a decision node gradually traversed when a final user type is determined from the plurality of the user types. The decision node may include a query. For example, the query may correspond to [Is the user male?]. As a result, the final user type may be determined through the traversal of the decision node, i.e., the traversal from a first decision node to a final decision node.

Herebelow, the set of the user type will be described.

The set of the user type includes a plurality of the user types classified for a service strategy. The service strategy may be determined by the service engine 120 For example, the service strategy may be set based on a trend, and the user type set may be classified into a [consumption conservative user type] insensitive to the trend, a [consumption moderate user type] following the trend and a [consumption progressive user type] leading the trend. According to an exemplary embodiment, each of the plurality of the user types may correspond to a final decision node in the decision tree.

The user type may be included in the set of the user type and may correspond to the decision node where the decision node is finally determined when the recommendation engine 130 completes a performance of a decision making in the decision node based on the description. According to an exemplary embodiment, the user type may be non-exclusively included in a plurality of sets of the user type. For example, the user type may be included in all of the set of the user type classified based on the trend and the set of the user type classified based on the gender.

The recommendation engine 130 receives a description from the manager 140 through the user ID provided from the service engine 120 (Steps S230 and S240). In more detail, the recommendation engine 130 transmits the user ID to the manager 140 (Step S230) and the manager 140 searches for a database based on the user ID to provide the description to the recommendation engine 130. According to an exemplary embodiment, the database may include a UD database and a CD database in a viewpoint of a physical implementation. According to an exemplary embodiment, when the user ID is independently defined by the service engine 120, the manager 140 may determine the description (e.g., UD and/or CD) by using a service engine ID and the user ID together.

The recommendation engine 130 generates an RD based on the description provided from the manager 140 (Step S245). The RD may include a user type in the SD and may be used for the service engine 120 to determine a recommended service.

Here below, a procedure of generating the RD by the recommendation engine 130 will be described.

The recommendation engine 130 checks whether the SD. Here, the SD defines a service provided from the service engine 120. According to an exemplary embodiment, the recommendation engine 130 may receive the SD from the service engine 120. According to another exemplary embodiment, the recommendation engine 130 may use an SD previously provided to the recommendation engine 130 without receiving the SD.

The recommendation engine 130 obtains the description based on the user ID and determines a user type defined in the SD based on the description. In such determination procedure, the recommendation engine 130 may perform a decision making from a first decision node to a final decision node to interpret the decision node, and the decision making may be performed through a decision inferred or determined based on the description.

For example, when the decision node requests the decision making for [Is the user Korean?] and an user e-mail address of the UD corresponds to [hello@abcd.co.kr], the recommendation engine 130 may infer the user as Korean.

For another example, when the decision node requests the decision making for a determination of [Is the user in his/her thirties?] and a user birth date of the UD corresponds to [May 5, 1980], the recommendation engine 130 may determine the user as one in his/her thirties.

When the user type is determined, the recommendation engine 130 provides the RD including the user type to the service engine 120 (Step S250). As described in <Appendix 4>, the RD may include the user type, and may include a plurality of corresponding user types when the user belongs to the plurality of user type sets.

For example, the decision tree may include two decision nodes. Also, a query in the first decision node may correspond to [Is the user positive and in his/her thirties] and a query in the final decision node may correspond to [Does the user prefer a blue color]. The UD may be defined or represented as FIGS. 3 and 4A. It is assumed that a birth date of the social information is May 5, 1980 and emotion information of the sensor information is negative. If an answer to the query in the first decision node is positive, the recommendation engine 130 may determine the user as the

[consumption progressive user type], and if negative, the recommendation engine 130 may query in a final decision node. If an answer to the query in the final decision node is positive, the recommendation engine 130 may determine the user as the [consumption conservative user type] and if negative, the recommendation engine 130 may determine the user as the [consumption moderate user type].

The service engine 120 determines a recommended service capable of being recommended through the RD provided from the recommendation engine 130 (Step S255). For example, when a user type in the RD is determined the [consumption progressive user type] and [the twenties female type], the service engine 120 may recommend a TV program of a genre favored by females in twenties among recent TV programs as the recommended service for a user request of a TV program.

The service engine 120 may provide the recommended service to the user terminal 110, and may support to determine whether the user terminal 110 uses the recommended service (Step S260).

Although only some exemplary embodiments have been described above, it would be understood by those skilled in the art that the embodiments can be modified or changed in various ways without departing from the technical principles and scope of the inventive concept defined by the appended claims.

<Appendix 1: User Description>

1. Introduction

The MPEG-UD standardizes the following four data formats: User Description (UD), Context Description (CD), and Service Description (SD), and Recommendation Description (RD). The UD is a set of descriptions which may contain static and dynamic information about a user. A device, a process, a software agent, an animal, an industrial process or an organization as well as a person can be a user. We propose a structure of the UD and its several sub-sets which are elements describing various characteristics of the user.

2. UD Tool 2.1. Root Element

The UD element serves as a root element of an MPEG-UD format. The root element shall be used as a topmost element in all messages transmitted. A root element UD provides an individual description for a user. Each individual description describes specific content using a top-level type.

2.1.1. Syntax

```
<element name="UD" type="ud:UserDescriptionType"/>
<complexType name="UserDescriptionType">
    <sequence>
        <element name="UserID" type="mpeg7:UserIdentifierType"/>
        <element name="UserProfile" type="ud:UserProfileType" minOccurs="0"/>
        <element name="UsageHistory" type="ud:UsageHistoryType" minOccurs="0"/>
        <element name="Preference" type="ud:PreferenceType" minOccurs="0"/>
        <element name="Emotion" type="ud:EmotionType" minOccurs="0"/>
        <element name="Schedule" type="ud:ScheduleType" minOccurs="0"/>
        <element name="Activity" type="ud:ActivityType" minOccurs="0"/>
```

-continued

```
        <element name="Intention" type="ud:IntentionType" minOccurs="0"/>
    </sequence>
    <attributeGroup ref="ct:commonAttributes"/>
</complexType>
<complexType name="BaseUserType" abstract="true"/>
```

2.1.2. Semantics

| Name | Definition |
| --- | --- |
| UD | Serves as a root element of an MPEG UD format. A UD element shall be used as a topmost element to make a UD in an instance of the MPEG-UD format. |
| UserDescriptionType | Specifies a syntax of the root element. This data type is a set of descriptions which may contain static and dynamic information about user. Within this Type, UserProfile, Preference, Emotion, Schedule or Activity element shall be instantiated. |
| UserID | Describes a unique identifier of a user. |
| UserProfile | Describes a user profile based on UserProfileType |
| UsageHistory | Describes a usage history based on UsageHistoryType. This element can represent a user's history for a given service, such as searching or movie recommendations. |
| Preference | Describes a preference based on PreferenceType. |
| Emotion | Describes emotion based on EmotionType. This type represents a user's emotion, including its changes over time. |
| Schedule | Describes a schedule based on ScheduleType. |
| Activity | Describes a user activity based on ActivityType. |
| Intention | Describes an intention of a user based on IntentionType. |
| commonAttributes | Describes a group of attributes for commonAttributes. The syntax and semantics of commonAttributes are specified in CommonType (M32384). |

2.2. UserProfileType

The UserProfileType represents an abstract concept of a "user". Concretely, a user can be a person, an organization (e.g., a company), a group of persons (e.g. a musical ensemble), a device or a mixed user (e.g., a cat and a person).

2.2.1. Syntax

```
<complexType name="UserProfileType" abstract="true">
    <complexContent>
        <extension base="ud:BaseUserType">
            <sequence>
                <element name="Specialty" type="ud:SpecialtyType" minOccurs="0" maxOccurs="unbounded"/>
            </sequence>
        </extension>
    </complexContent>
</complexType>
```

2.2.2. Semantics
Semantics of the UserProfileType

| Name | Definition |
| --- | --- |
| UserDescriptionType | Describes a basic entity of user information (abstract). A User Profile entity shall correspond to one of a variety of a user including a person, a person group, an organization, a device, a mixed user and so forth. |
| Specialty | Describes a specialty that this group has in various fields. |

2.3. PersonProfileType

The PersonProfileType describes a person entity. The PersonProfileType can be used to describe individual basic properties of persons.

2.3.1. Syntax

```
<complexType name="PersonProfileType">
    <complexContent>
        <extension base="ud:UserProfileType">
            <sequence>
                <element name="PersonInformation" type="mpeg7:PersonType" minOccurs="0"/>
                <element name="Birthtime" type="dateTime"/>
                <element name="Language" type="ud:LanguageType" minOccurs="0" maxOccurs="unbounded"/>
                <element name="Accessibility" type="ud:AccessibilityType" minOccurs="0"/>
                <element name="SocialInformation" type="ud:SocialType" minOccurs="0" maxOccurs="unbounded"/>
            </sequence>
        </extension>
    </complexContent>
</complexType>
```

2.3.2. Semantics
Semantics of the Person ProfileType

| Name | Definition |
|---|---|
| Language | User language |
| Accessibility | User accessibility |
| SocialInformation | User Social Information |

2.4. GroupedProfileType

The GroupedProfileType can be used to describe basic attributes of a group which is a set of users.

2.4.1. Syntax

```
<complexType name="GroupedProfileType">
    <complexContent>
        <extension base="ud:UserProfileType">
            <choice minOccurs="2" maxOccurs="unbounded">
                <element name="User" type="ud:UserProfileType"/>
                <element name="UserRef" type="anyURI"/>
            </choice>
        </extension>
    </complexContent>
</complexType>
```

2.4.2. Semantics
Semantics of the GroupedProfileType

| Name | Definition |
|---|---|
| GroupedProfileType | Describes an individual group's basic profile. |
| User | Describes information of a group's member. (i.e. User Profile, Device Profile, Organization Profile) |
| UserRef | Describes the reference of a group's member as anyURI. |

2.4.3. Example

```
<ud:UserProfile xsi:type="ud:PersonGroupProfileType">
    <ud:BasicInformation>
        <mpeg7:Name>GroupOrchestraABC</mpeg7:Name>
    </ud:BasicInformation>
    <ud:Specialty domain="Playing">
        <ud:Name>Piano Trio</ud:Name>
    </ud:Specialty>
</ud:UserProfile>
```

2.5. LanguageType

The LanguageType can be used to describe properties of a specific language that a user can use.

2.5.1. Syntax
Semantics of the LanguageType:

```
<complexType name="LanguageType">
    <sequence>
        <element name="Name" type="language"/>
        <element name="CompetenceReference" type="ud:LanguageCompetenceReferenceType" minOccurs="0"/>
    </sequence>
    <attribute name="type">
        <simpleType>
            <restriction base="string">
                <enumeration value="native"/>
                <enumeration value="foreign"/>
            </restriction>
        </simpleType>
    </attribute>
    <attribute name="LanguageRegion" type="string" use="optional"/>
    <attribute name="LanguageAccent" type="string" use="optional"/>
    <attribute name="ReadingLevel" use="optional">
        <simpleType>
            <restriction base="NMTOKEN">
                <enumeration value="low"/>
                <enumeration value="mid"/>
                <enumeration value="high"/>
            </restriction>
        </simpleType>
    </attribute>
    <attribute name="WritingLevel" use="optional">
        <simpleType>
            <restriction base="NMTOKEN">
                <enumeration value="low"/>
                <enumeration value="mid"/>
                <enumeration value="high"/>
            </restriction>
        </simpleType>
    </attribute>
    <attribute name="SpeakingLevel" use="optional">
        <simpleType>
            <restriction base="NMTOKEN">
                <enumeration value="low"/>
                <enumeration value="mid"/>
                <enumeration value="high"/>
            </restriction>
        </simpleType>
    </attribute>
    <attribute name="ListeningLevel" use="optional">
        <simpleType>
            <restriction base="NMTOKEN">
                <enumeration value="low"/>
                <enumeration value="mid"/>
                <enumeration value="high"/>
            </restriction>
        </simpleType>
    </attribute>
</complexType>
```

2.5.2. Semantics

| Name | Definition |
|---|---|
| LanguageType | Describes one or more languages that a user can use. Multiple languages are allowed. |
| Name | Indicates a name of a language which this user can use. |
| LanguageRegion | Describes a language based on a region where the language is used. E.g., British English, South Korean |
| Type | Indicates types of language. The types of language are defined as follows: Native - This is the language that a person has spoken from earliest childhood. Foreign - This is any other languages except for the native language. |
| LanguageAccent | Describes an accent of a language. E.g., Italian Accent, Jeju Accent. |
| ReadingLevel | Describes a reading level of a user for a specific language |
| WritingLevel | Describes a writing level of a user for a specific language |
| SpeakingLevel | Describes a speaking level of a user for a specific language |
| ListeningLevel | Describes a listening level of a user for a specific language |

2.6. LanguageCompetenceReferenceType

2.6.1. Syntax

```
<complexType name="LanguageCompetenceReferenceType">
    <sequence>
        <element name="CompetenceTestName"
type="string"/>
        <element name="CompetenceLevel"
type="CompetenceLevelType" maxOccurs="unbounded"/>
    </sequence>
    <attribute name="CompetenceTestURI" type="anyURI" use="optional"/>
    <attribute name="CompetenceTestDate" type="date" use="optional"/>
</complexType>
<complexType name="CompetenceLevelType">
    <sequence>
        <choice>
            <element name="FieldScore">
                <complexType>
                    <simpleContent>
                        <extension base="integer">
                            <attribute name="maxScore" type="integer" use="optional"/>
                        </extension>
                    </simpleContent>
                </complexType>
            </element>
            <element name="FieldLevel" type="string"/>
        </choice>
    </sequence>
    <attribute name="competenceField" type="string" use="optional"/>
</complexType>
```

2.6.2. Semantics

| Name | Definition |
|---|---|
| LanguageCompetenceReferenceType | Describes a user's competence for a specific language in a common test |
| CompetenceTest Name | Provides a competence test name. E.g., TOEFL, IELTS |
| CompetenceLevel | Provides a score or level of a competence test. |
| CompetenceTestURI | Provides a URI of a competence test. E.g., http://www.ets.org/toefl |
| CompetenceTestDate | Provides a date of a competence test taken by a user. |

2.7. AccessibilityType

The AccessibilityType can be used to describe characteristics of a user's deficiency. The description can be used by an adaptation specific engine to optimize an experience of contents and a user interface for the user, and to recommend a best way to achieve special goals for the user having problems with specific physical difficulties.

2.7.1. Syntax

```
<complexType name="AccessibilityType">
    <sequence>
        <element name="AuditoryImpairment"
type="mpeg21:AuditoryImpairmentType" minOccurs="0"/>
        <element name="VisualImpairment"
type="mpeg21:VisualImpairmentType" minOccurs="0"/>
        <element name="BodyImpairment"
type="ud:BodyImpairmentType" minOccurs="0"/>
    </sequence>
</complexType>
<complexType name="BodyImpairmentType">
    <attribute name="availableFinger" type="integer"/>
    <attribute name="arm" type="ud:side"/>
    <attribute name="leg" type="ud:side"/>
</complexType>
<simpleType name="side">
    <restriction base="NMTOKEN">
        <enumeration value="both"/>
        <enumeration value="left"/>
        <enumeration value="right"/>
    </restriction>
</simpleType>
```

2.7.2. Semantics

Semantics of the AccessibilityType:

| Name | Definition |
|---|---|
| AccessibilityType | Describes user's differences in his/her abilities in detail in terms of accessibility needs. The Accessibility element describes in a systematic way so that it covers well possible weakness to access a service in any area. |
| AuditoryImpairment | Describes characteristics of a particular user's auditory deficiency. The description can be used by an audio resource adaptation engine to optimize an experience of audio contents for a user. It can be also used by a contents provider to support more suitable contents to consider user's impairment. |
| VisualImpairment | Visual Impairment covers a wide range of conditions. The various forms of visual impairment include a difficulty to read a fine print, low vision that cannot be corrected by standard glasses, total blindness, a color vision deficiency, i.e., the inability to recognize certain colors. The low vision conditions, due to their wide variety, are described by a user's symptoms, but the names of conditions are not described. |
| BodyImpairmentType | Describes characteristics of a user's body deficiency |
| availableFinger | Indicates the number of available fingers |
| Arm | Indicates a deficiency of arms. |
| Leg | Indicates a deficiency of legs. |
| Side | Describes specific side information |
| Both | Indicates both sides |
| Left | Indicates a left side |
| Right | Indicates a right side |

2.8. Social Type
2.8.1. Syntax

```
<xsd:complexType name="SocialType" abstract="true">
    <xsd:sequence>
        <xsd:element name="SocialCommunity" type="xsd:string" minOccurs="0"/>
        <xsd:element name="Sharing" type="SharingType" minOccurs="0"/>
    </xsd:sequence>
</xsd:complexType>
```

2.8.2 Semantics
Semantics of the SocialType:

| Name | Definition |
| --- | --- |
| SocialCommunity | Describes information on social communities provided by a given service |
| Sharing | Describes information on user's sharing objects |

2.9. UsageHistoryType

The UsageHistoryType describes a history of actions on a specific area by a user. A usage history of media contents, movement of a user, a pattern in an on-line social network and a purchase record at a specific store can be UsageHistory.

2.9.1. Syntax

```
<complexType name="UsageHistoryType">
    <complexContent>
        <extension base="ud:BaseUserType">
            <sequence>
                <element name="DetailedUserInteraction" type="ud:DetailedUserInteractionType"/>
            </sequence>
        </extension>
    </complexContent>
</complexType>
<complexType name="DetailedUserInteractionType">
    <annotation>
        <documentation>The main complex type describing detailed interaction with multimedia items</documentation>
    </annotation>
    <complexContent>
        <extension base="ud:BaseUserType">
            <sequence>
                <element name="MultimediaExperiences">
                    <complexType>
                        <sequence>
                            <element name="MultimediaExperience" type="ud:MultimediaExperienceType"/>
                        </sequence>
                    </complexType>
                </element>
            </sequence>
        </extension>
    </complexContent>
</complexType>
```

2.9.2. Semantics
Semantics of the UsageHistoryType:

| Name | Definition |
| --- | --- |
| UsageHistoryType | Describes a history of actions on a specific area by a user. A usage history of media contents, movement of a user, a pattern in an on-line social network and a purchase record at a specific store can be a UsageHistory. UsageHistoryType extends BaseUserType. |
| MultimediaExperiences | A set of multimedia experiences of a user |
| DetailedUserInteraction | Structure containing information about multimedia experiences of a user. |

2.10. EventType
An abstract representation of a generic real event.
2.10.1. Syntax

```
<xs:complexType name="eventType" abstract="true">
    <xs:annotation>
        <xs:documentation>An abstract representation of a generic real event</xs:documentation>
    </xs:annotation>
    <xs:attribute name="startTime" type="xs:dateTime"/>
    <xs:attribute name="endTime" type="xs:dateTime"/>
    <xs:attribute name="coordinates" type="xs:anyURI"/>
</xs:complexType>
```

2.10.2. Semantics
Semantics of the EventType:

| Name | Definition |
| --- | --- |
| eventType | An abstract representation of a generic real event |
| startTime | The start time of the event |
| endTime | The end time of the event |
| Coordinates | The geolocalisation of the event |

2.11. interactionAtomType
An abstract representation of observables and artefacts.
2.11.1. Syntax

```
<complexType name="InteractionAtomType">
    <annotation>
        <documentation>An abstract representation of observables and artefacts</documentation>
    </annotation>
    <sequence>
        <element name="Role" type="anyURI">
            <annotation>
                <documentation>A piece of metadata that expresses the functionality of an interaction atom (e.g. an observable or an artefact) while in a specific state. For example, if the user adds a text part (artefact) with the intention of annotating an image (observable), then the role of such text will be "annotation"</documentation>
            </annotation>
        </element>
        <element name="MultimediaObject" type="didI:ItemType">
            <annotation>
                <documentation>Any type of data that can be handled by a device in order to produce multimedia contents, e.g. in video, audio, text formats. The description of a multimedia object may include its low-level characteristics (e.g. the "colour histogram" of a video). A multimedia object can play a role as an observable or as an artefact during a state of a multimedia experience.
Multimedia objects comprise the following types of objects:
    Text, Image, Video, Audiovisual, Audio, Application
</documentation>
            </annotation>
        </element>
        <sequence minOccurs="0">
            <element name="Composition">
                <complexType>
                    <sequence maxOccurs="unbounded">
                        <element name="Artefact" type="ud:ArtefactType"/>
```

```
                <element
name="Observable" type="ud:ObservableType"/>
            </sequence>
          </complexType>
        </element>
      </sequence>
    </complexType>
```

2.11.2. Semantics
Semantics of the interactionAtomType:

| Name | Definition |
|---|---|
| InteractionAtomType | An abstract representation of observables and artefacts |
| Role | A piece of metadata that expresses a functionality of an interaction atom (e.g. an observable or an artefact) while in a specific state. For example, if a user adds a text part (artefact) with an intention of annotating an image (observable), then a role of such text will be "annotation" |
| MultimediaObject | Any type of data that can be handled by a device in order to produce multimedia contents, e.g. in video, audio, text formats. A description of a multimedia object may include its low-level characteristics (e.g. the "colour histogram" of a video). A multimedia object can play a role as an observable or as an artefact during a state of a multimedia experience. Multimedia objects comprise following types of object: Text, Image, Video, AudioVisual, Audio, Application |
| Composition | Any composition of Artefacts or Observables |

2.12. ArtefactType

A specific multimedia object added to an observable by a user while in a specific state. An artefact is any multimedia object actively generated by a user (e.g. tags, annotations, voice) or selected by the user during a specific state of his/her multimedia experience.

2.12.1. Syntax

```
    <complexType name="ArtefactType">
    <annotation>
        <documentation>A specific multimedia object added to an
observable by a user while in a specific state. An artefact is any
multimedia object actively generated by the user (e.g. tags, annotations,
voice) or selected by the user during a specific state of his/her multimedia
experience</documentation>
    </annotation>
    <complexContent>
        <extension base="ud:InteractionAtomType"/>
    </complexContent>
    </complexType>
```

2.13. ObservableType

A specific multimedia object that a user may decide to use, while in a specific state, during his/her multimedia experience. An observable is any multimedia object visible to the user in a specific state (e.g. an image in the graphic interface).

2.13.1. Syntax

```
    <complexType name="ObservableType">
        <annotation>
            <documentation>A specific multimedia object that a user
may decide to use, while in a specific state, during his/her multimedia
experience. An observable is any multimedia object visible to the user in a
specific state (e.g. an image in the graphic interface)</documentation>
        </annotation>
```

```
        <complexContent>
            <extension base="ud:InteractionAtomType">
                <sequence>
                    <element name="UsageEvent"
type="ud:EventType">
                        <annotation>
                            <documentation>A specific
event which occurs every time the user decides to actually use an
observable (e.g. when the user is reading a text, watching a video,
...)</documentation>
                        </annotation>
                    </element>
                </sequence>
            </extension>
        </complexContent>
    </complexType>
```

2.13.2. Semantics

| Name | Definition |
|---|---|
| UsageEvent | Structure containing information about when an observable has been actually used by a user. A specific event which occurs every time the user decides to actually use an observable (e.g. when the user is reading a text, watching a video, . . . ) |

2.14. MultimediaExperienceType

A complex set of events (states and usage events) representing fruition by a user, within a given time interval, of a certain number of multimedia contents.

2.14.1. Syntax

```
    <complexType name="MultimediaExperienceType">
        <annotation>
            <documentation>The complex set of events (states and
usage events) representing fruition by a user, within a given time interval,
of a certain number of multimedia contents</documentation>
        </annotation>
        <sequence>
            <element name="States">
                <complexType>
                    <sequence>
                        <element name="State"
type="ud:StateType" maxOccurs="unbounded"/>
                    </sequence>
                </complexType>
            </element>
        </sequence>
    </complexType>
```

2.14.2. Semantics

| Name | Definition |
|---|---|
| States | States that compose a multimedia experience |

2.15. stateType

A specific event, identified by a set of "variables" or "coordinates" univocally identifying a set of interaction atoms and their respective roles in a given state of a multimedia experience.

2.15.1. Syntax

```
<complexType name="StateType">
    <annotation>
        <documentation>A specific event, identified
by a set of "variables" or "coordinates" univocally identifying a set of
interaction atoms and their respective roles in a given state of a multimedia
experience</documentation>
    </annotation>
    <complexContent>
        <extension base="ud:EventType">
            <sequence>
                <element name="Artefacts">
                    <complexType>
                        <sequence>
                            <element name="Artefact" type="ud:ArtefactType" maxOccurs="unbounded"/>
                        </sequence>
                    </complexType>
                </element>
                <element name="Observables">
                    <complexType>
                        <sequence>
                            <element name="Observable" type="ud:ObservableType" maxOccurs="unbounded"/>
                        </sequence>
                    </complexType>
                </element>
                <element name="SemanticallyRelatedStates">
                    <complexType>
                        <sequence>
                            <element name="StatesRef">
                                <simpleType>
                                    <list itemType="anyURI"/>
                                </simpleType>
                            </element>
                        </sequence>
                    </complexType>
                </element>
            </sequence>
            <attribute name="order" type="nonNegativeInteger"/>
            <attribute name="id" type="anyURI"/>
        </extension>
    </complexContent>
</complexType>
```

2.15.2. Semantics

| Name | Definition |
| --- | --- |
| Artefacts | Artefacts characterizing a state |
| Observables | Observables characterizing a state |
| SemanticallyRelatedStates | Structure pointing to semantically related states to a current state. Specific semantics of this relation is demanded to a controlled vocabulary. |

2.16. PreferenceType

This PreferenceType describes a preference related to various services. A Preference could be conceived of as an individual's attitude towards a set of objects. Interested topics, a preference on a presentation style, a sensory effects preference, a score of satisfaction, service usage preferences, a preference on service provider, interested topics and media can be a Preference.

2.16.1. Syntax

```
<complexType name="PreferenceType">
    <complexContent>
        <extension base="ud:BaseUserType">
            <sequence>
                <element name="UserPreferences" type="mpeg7:UserPreferencesType" minOccurs="0"/>
                <element name="AudioPresentationPreferences" type="mpeg21:AudioPresentationPreferencesType" minOccurs="0"/>
                <element name="DisplayPresentationPreferences" type="mpeg21:DisplayPresentationPreferencesType" minOccurs="0"/>
                <element name="GraphicsPresentationPreferences" type="mpeg21:GraphicsPresentationPreferencesType" minOccurs="0"/>
                <element name="ServicePreference" type="ud:ServicePreferencesType" minOccurs="0" maxOccurs="unbounded"/>
                <element name="TranslationPreference" type="ud:TranslationPreferenceType" minOccurs="0"/>
                <element name="PreferenceDescription" type="ud:UserDescriptionType"/>
            </sequence>
        </extension>
    </complexContent>
</complexType>
```

2.16.2. Semantics

Semantics of the PreferenceType:

| Name | Definition |
| --- | --- |
| PreferenceType | Describes a preference related to various services. A Preference could be conceived of as an individual's attitude towards a set of objects. Interested topics, a preference on a presentation style, a sensory effects preference, a score of satisfaction, service usage preferences, a preference on a service provider, interested topics and media can be a Preference. |
| UserPreferences | Describes user's preferences pertaining to consumption of a multimedia content, in particular, filtering, searching and browsing of the multimedia content. The mpeg7:UserPreferencesType contains |

| Name | Definition |
|---|---|
| | FilteringAndSearchPreferences, BrowsingPreferences and RecordingPreferences, and contains an attribute indicating whether user's preferences may be updated automatically. |
| AudioPresentation Preferences | Describes preferences of a user regarding presentation or rendering or audio resources. The mpeg7 mpeg21:AudioPresentationPreferencesType contains VolumeControl, AudibleFrequencyRange, AudioOutputDevice, BalancePreference, Soundfield and SoniferousSpeed element. |
| DisplayPresentationPreferences | Describes preferences of a user regarding presentation or rendering of images and videos. This mpeg21:DisplayPresentationPreferencesType includes descriptors of preferences related to a color and a conversion of stereoscopic video. The ColorTemperaturePreference, the BrightnessPreference, the SaturationPreference and the ContrastPreference describe preferences of a user regarding a color of displayed visual contents in terms of a color temperature, brightness, saturation and contrast, each of which is a usual color attribute of images. StereoscopicVideoConversion describes preferences of a user related to conversion of a 2D video to a 3D stereoscopic video and also conversion of a 3D stereoscopic video to a 2D video. |
| GraphicsPresentationPreferences | Describes presentation preferences related to graphics media. This mpeg21:GraphicsPresentationPreferencesType contains GeometryEmphasis, TextureEmphasis and AnimationEmphasis element. |
| UserSensoryPreference | Describes sensor preferences. |
| ServicePreference | Describes a level of preferences for specific services. |
| UserInputModality Preference | |
| ObjectTypePreference | |
| TranslationPreference | Describes a list of user's preferences for language translation |
| PreferenceDescription | |

2.17. ServicePreferencesType

ServicePreferencesType describes a level of preferences for specific services. Every user can have his personal preferences of the various services, respectively. A UD document can contain preferences about specific services and providers of services recommendation.

2.17.1. Syntax

```
<complexType name="ServicePreferencesType">
    <sequence>
        <element name="Service" type="anyURI" minOccurs="0"/>
        <element name="ServicePriority" type="ct:ZeroToTenOrdinalType" minOccurs="0"/>
    </sequence>
    <attribute name="preferenceLevel" type="ct:ZeroToOnehundredOrdinalType" use="required"/>
</complexType>
```

2.17.2. Semantics
Semantics of the ServicePreferencesType:

| Name | Definition |
|---|---|
| ServicePreferencesType | Describes a level of preferences for specific services. Every user can have his/her personal preference of the various services, respectively. A UD document can contain preferences about specific services and providers of services recommendation |
| ServicePriority preferenceLevel | Indicate a priority or weight assigned to a particular user preference, relative to other components. A range of preference values is from 0 to 100. |

2.17.3. Examples

```
<ud:Preference>
    <ud:ServicePreference preferenceLevel="95">
        <ud:Name>ABC Service</ud:Name>
        <ud:Identifier>http://ABC.com</ud:Identifier>
        <ud:ProviderIdentifier>ABC Company</ud:ProviderIdentifier>
    </ud:ServicePreference>
</ud:Preference>
```

2.18. Translation PreferencesType

This Translation PreferencesType describes the preferences for translation services.

2.18.1. Syntax

```
<complexType name="TranslationPreferenceType">
    <sequence>
        <element name="SourceLanguagePreference" type="language" minOccurs="0"/>
        <element name="TargetLanguagePreference" type="language" minOccurs="0"/>
        <element name="SpeechStylePreference" type="ud:SpeechStylePreferenceType"/>
        <element name="VoiceGenderPreference" type="ud:VoiceGenderType" default="unspecified" minOccurs="0"/>
    </sequence>
    <attribute name="VoicePitch" type="mpeg7:nonNegativeReal" use="optional"/>
    <attribute name="VoiceSpeed" type="mpeg7:nonNegativeReal" use="optional"/>
    <attribute name="RequestVariants" type="boolean" use="optional" default="false"/>
</complexType>
```

2.18.2. Semantics

Semantics of the ServicePreferencesType:

| Name | Definition |
|---|---|
| SourceLanguagePreference | Describes a user's preference on a source language for translation. |
| TargetLanguagePreference | Describes a user's preference on a target language for translation. |
| SpeechStylePreference | Describes a user's preference on a style of a translated output speech. |
| VoiceGenderPreference | Describes a user's preference on a gender of a translated output speech. |
| VoicePitch | Describes a user's preference on a pitch of a translated output speech. |
| VoiceSpeed | Describes a user's preference on a speed of a translated output speech. |
| RequestVariants | |

2.19. SpeechStylePreferenceType
2.19.1. Syntax

```
<simpleType name="SpeechStylePreferenceType">
    <restriction base="NMTOKEN">
        <enumeration value="formal"/>
        <enumeration value="informal"/>
    </restriction>
</simpleType>
```

2.20. VoiceGenderType
2.20.1. Syntax

```
<simpleType name="VoiceGenderType">
    <restriction base="NMTOKEN">
        <enumeration value="female"/>
        <enumeration value="male"/>
        <enumeration value="neuter"/>
        <enumeration value="unspecified"/>
    </restriction>
</simpleType>
```

2.21. EmotionType

The EmotionType can be used to represents a user's subjective notion and feeling. It can describe user's emotion including its changes over time. The emotion can be acquired by some direct input of the user or inference results from sensor data.

2.21.1. Syntax

```
<complexType name="EmotionType">
    <complexContent>
        <extension base="ud:BaseUserType">
            <sequence>
                <choice minOccurs="0" maxOccurs="unbounded">
                    <element name="EmotionGroup" type="ud:EmotionGroupType"/>
                    <choice>
                        <element name="DynamicEmotionVocabularySet" type="ud:VocabularySetType">
                            <unique name="unique-vocabulary">
                                <selector xpath="ud:vocabulary"/>
                                <field xpath="@name"/>
                            </unique>
                        </element>
                        <element name="StaticEmotionVocabularySet" type="ct:termReferenceListType"/>
                    </choice>
                </choice>
            </sequence>
        </extension>
    </complexContent>
</complexType>
```

2.21.2. Semantics

Semantics of the EmotionType:

| Name | Definition |
|---|---|
| EmotionType | Describes a user's subjective notion and feeling. It can describe a user's emotion including its changes over time. The emotion can be acquired by some direct input of the user or inference results from sensor data. |
| EmotionGroup | Describes an emotion or some related information. The emotion is described by several Emotion Description, each being present with different values of reliability. |
| DynamicEmotionVocabularySet | Describes a dynamic set of emotion vocabularies. Only vocabulary names defined in a declared emotion vocabulary set of a given element can be used for representations of emotions.<br>The VocabularySetType can be used to describe fundamental emotions according to a set of definite criteria. Many different theories implicitly posit different ontologies of emotion. There has been dispute about what emotions really are, and indeed. For this reason, a complete set of vocabularies for representing emotions does not exist. The VocabularySetType can be temporarily used to define a set of emotion vocabularies to solve that problem. |
| StaticEmotionVocabularySet | Describes a static set of emotion vocabularies. Other values that are datatype-valid with respect to mpeg7:term ReferenceType are reserved. |

2.21.3. Examples

```
<ud:Emotion>
    <ud:EmotionGroup triggeredBy="http://www.abc.com/video.mp4"
detectedFrom="eyes" emotion-set="#big6">
        <ud:PeriodOfOccurrence>
            <ct:startTime>2001-12-17T09:30:47Z</ct:startTime>
            <ct:endTime>2001-12-17T12:30:47Z</ct:endTime>
        </ud:PeriodOfOccurrence>
        <ud:EmotionDescription reliability="0.9">
            <ud:emotionName>anger</ud:emotionName>
            <ud:value>
                <ct:ZeroToOneRatio>0.5</ct:ZeroToOneRatio>
            </ud:value>
        </ud:EmotionDescription>
    </ud:EmotionGroup>
    <ud:EmotionGroup triggeredBy="http://www.abc.com/happy.mp3"
detectedFrom="ears" emotion-set="/EmotionVocabularySet#mpegud-emotion">
        <ud:PeriodOfOccurrence>
            <ct:startTime>2001-12-19T09:30:47Z</ct:startTime>
            <ct:endTime>2001-12-19T10:39:47Z</ct:endTime>
        </ud:PeriodOfOccurrence>
    <ud:EmotionDescription reliability="0.2">
        <ud:emotionName>emotion1</ud:emotionName>
        <ud:value>
            <ct:ZeroToOneRatio>0.5</ct:ZeroToOneRatio>
        </ud:value>
    </ud:EmotionDescription>
    <ud:EmotionDescription>
        <ud:emotionName>emotion2</ud:emotionName>
        <ud:value>
            <ct:ZeroToOneRatio>0.9</ct:ZeroToOneRatio>
        </ud:value>
    </ud:EmotionDescription>
    </ud:EmotionGroup>
    <ud:EmotionVocabularySet id="big6">
        <ud:vocabulary name="anger"/>
        <ud:vocabulary name="disgust"/>
        <ud:vocabulary name="fear"/>
        <ud:vocabulary name="happiness"/>
        <ud:vocabulary name="sadness"/>
        <ud:vocabulary name="surprise"/>
    </ud:EmotionVocabularySet>
    <ud:EmotionVocabularySet id="mpegud-emotion">
        <ud:vocabulary name="emotion1"/>
        <ud:vocabulary name="emotion2"/>
        <ud:vocabulary name="emotion3"/>
    </ud:EmotionVocabularySet>
</ud:Emotion>
<ud:Emotion>
    <ud:EmotionVocabularySet id="big6">
        <ud:vocabulary name="anger"/>
        <ud:vocabulary name="disgust"/>
        <ud:vocabulary name="fear"/>
        <ud:vocabulary name="happiness"/>
        <ud:vocabulary name="sadness"/>
        <ud:vocabulary name="surprise"/>
    </ud:EmotionVocabularySet>
    <ud:EmotionVocabularySet id="pad">
        <ud:vocabulary name="pleasure"/>
        <ud:vocabulary name="arousal"/>
        <ud:vocabulary name="dominance"/>
    </ud:EmotionVocabularySet>
    <ud:EmotionVocabularySet id="mpegud-emotion">
        <ud:vocabulary name="emotion1"/>
        <ud:vocabulary name="emotion2"/>
        <ud:vocabulary name="emotion3"/>
    </ud:EmotionVocabularySet>
</ud:Emotion>
```

2.22. VocabularySetType

The VocabularySetType can be used to describe fundamental vocabularies according to a set of definite criteria. There has been a dispute about what vocabularies really are, and indeed to describe specific information. For this reason, a complete set of vocabularies for representing a special domain does not exist. The VocabularySetType can be used to describe a temporarily used set of vocabularies.

2.22.1. Syntax

```
<complexType name="VocabularySetType">
    <sequence>
        <element name="vocabulary" maxOccurs="unbounded">
            <complexType>
                <attribute name="name" type="ct:valueByNominal" use="required"/>
            </complexType>
        </element>
    </sequence>
    <attribute name="id" type="ID" use="required"/>
</complexType>
```

2.22.2. Semantics
Semantics of the VocabularySetType:

| Name | Definition |
|---|---|
| VocabularySetType | Describe fundamental vocabularies according to a set of definite criteria. There has been a dispute about what vocabularies really are, and indeed to describe specific information. For this reason, a complete set of vocabularies for representing a special domain does not exist. The VocabularySetType can be used to describe a temporarily used set of vocabularies. |
| Vocabulary | Describes some information about each vocabulary which composes an emotionvocabularyset. |
| Name | Describes a name of vocabulary |
| Id | Describes a unique ID of a VocabularySet |

2.23. EmotionGroupType

The EmotionGroupType can be used to describe and specify detailed information about an emotion state of a user according to a specific duration. The emotion-set attribute declares a global emotion vocabulary set which is predefined by EmotionVocabularySetType Element.

2.23.1. Syntax

```
<complexType name="EmotionGroupType">
    <sequence>
        <element name="PeriodOfOccurrence" type="ct:TimeType"/>
        <element name="EmotionDescription" type="ud:EmotionDescriptionType" maxOccurs="unbounded"/>
    </sequence>
    <attributeGroup ref="ud:EmotionSource"/>
    <attribute name="emotion-set" type="anyURI" use="required"/>
</complexType>
<attributeGroup name="EmotionSource">
    <attribute name="triggeredBy" type="anyURI"/>
    <attribute name="detectedFrom" type="string"/>
</attributeGroup>
<complexType name="EmotionDescriptionType">
    <sequence>
        <element name="emotionName" type="token"/>
        <element name="value" type="ct:normalizedRatioValueType"/>
    </sequence>
    <attribute name="reliability" type="ct:ZeroToOneRatioType"/>
</complexType>
```

2.23.2. Semantics
Semantics of the EmotionGroupType:

| Name | Definition |
|---|---|
| EmotionGroupType | Describes an emotion or some related information. The emotion is described by several EmotionDescriptions, each being present with different values of reliability. |
| PeriodOfOccurrence | Describes starting and ending absolute times. This ct:TimeType denotes an absolute time at which an emotion or related some information happened. |
| EmotionDescription | Describes a specific emotional state. |
| emotionName | Denotes a name of emotion as a result of measuring a user's emotional state. A value of "name" must be one of predefined vocabularies of an emotion-set. For example, when it comes to defining "BigSix" as a value for "emotion-set" attribute of "Emotion Group" element, only acceptable values are:[anger, disgust, fear, happiness, sadness, surprise](refer to the Bix6 theory made by Paul Ekman) |
| Value | Describes a level of emotion as a result of measuring a user's emotional state. This value can be described based on normalizedRatioValueType. |
| Reliability | Describes a degree of reliability as a result of measuring a user's emotional state. A value of "reliability" must be a floating point number and cannot be lower than 0 or greater than 1. |
| EmotionSource | Describes modality through which an emotion is produced and what caused this emotion. |
| triggeredBy | Describes who and what caused an emotion. The emotion can be triggered by such a vehicle as persons, animals and media. |
| detectedFrom | Describes modality where an emotion is produced. A specific user emotion is usually detected through human's action and appearances such as face, gesture, voice, word, posture and electroencephalography EEG). |

-continued

| Name | Definition |
|---|---|
| emotion-set | Describes which emotion vocabularies set shall be used to describe several emotion descriptions. It is possible to refer to a vocabulary defined in the same or in a separate document, through any URI. |

2.24. ScheduleType

This ScheduleType represents a plan for events related to a user. Social, religious, commercial or administrative events information can be described by ScheduleType. This type describes a combination of event, time and other information of schedule.

2.24.1. Syntax

```
<complexType name="ScheduleType">
    <complexContent>
        <extension base="ud:BaseUserType">
            <sequence>
                <element name="Event" type="mpeg7:EventType"/>
                <element name="SharedUser" type="mpeg7:UserIdentifierType" minOccurs="0" maxOccurs="unbounded"/>
                <element name="Time" type="ct:ExtendedTimeType"/>
            </sequence>
            <attribute name="descriptionMethod" use="optional">
                <simpleType>
                    <restriction base="string">
                        <enumeration value="byUser"/>
                        <enumeration value="byMachine"/>
                        <enumeration value="byLearning"/>
                        <enumeration value="bySystem"/>
                        <enumeration value="byOthers"/>
                    </restriction>
                </simpleType>
            </attribute>
        </extension>
    </complexContent>
</complexType>
```

2.24.2. Semantics

Semantics of the ScheduleType:

| Name | Definition |
|---|---|
| ScheduleType | Represents a plan for events related to a user. Social, religious, commercial or administrative events information can be described by ScheduleType. This type describes a combination of event, time and other information of a schedule |
| Event | Describes an event about a specific schedule event. |
| Description | Describes a description giving additional information. |
| SharedUser | Indicates that which users can share a schedule information. |
| Time | Describes time information of a schedule. |
| descriptionMethod | Describes a method how an MPEG-UD document can acquire this schedule information. Schedule information can be described by a machine or by a system using an inference engine as well as by a user (default). In other words, some schedule descriptions can be automatically generated by analyzing a user's intention. In this case, this information may or may not be true. |

2.24.3. Examples

```
<ud:Schedule descriptionMethod="byLearning">
    <ud:Event>Meeting for Conference</ud:Event>
    <ud:SharedUser>ID_2013710475</ud:SharedUser>
    <ud:Time recurrence="daily" numOfRecurrences="10">
        <ct:startTime>2013-12-17T09:00:00Z</ct:startTime>
        <ct:endTime>2013-12-17T11:00:00Z</ct:endTime>
    </ud:Time>
</ud:Schedule>
```

2.25. ActivityType

This ActivityType describes behaviors such as running, walking, drinking, watching and so on.

2.25.1. Syntax

```
<complexType name="ActivityType">
    <complexContent>
        <extension base="ud:BaseUserType">
            <sequence>
                <element name="PeriodOfOccurrence" type="ct:TimeType"/>
                <element name="ActivityDescription" maxOccurs="unbounded">
                    <complexType>
                        <sequence minOccurs="0">
                            <element name="MovingSpeed" type="ct:valueByRatio" minOccurs="0"/>
                            <element name="Velocity" type="ct:valueByRatio"/>
                            <element name="Orientation" type="ct:valueByRatio"/>
                            <element name="Location" type="cd:LocationType" minOccurs="0"/>
                            <element name="PhysicalState" minOccurs="0">
                                <complexType>
                                <sequence>
                                <element name="RespirationRate" type="ct:valueByRatio" minOccurs="0"/>
                                </sequence>
                                </complexType>
                            </element>
                        </sequence>
                    </complexType>
                </element>
            </sequence>
        </extension>
    </complexContent>
</complexType>
```

2.25.2. Semantics
Semantics of the ActivityType:

| Name | Definition |
| --- | --- |
| ActivityType | Describes behaviors such as running, walking, drinking, watching, and so on. |
| PeriodOfOccurrence | Describes a time point or interval of an activity. |
| Description | Describes additional Information of an activity. |
| ActivityItem | Describes an activity which a user did. |
| MovingSpeed | Describes a moving speed of a user. (m/s) |
| PhysicalState | Describes a physical state of a user. |
| Heartbeat | Indicates an heartbeat of a user |
| ECG | Indicates an ECG value of a user |
| RespirationRate | Indicates a respiration rate of a user |

2.25.3. Examples

```
<ud:Activity>
    <ud:PeriodOfOccurrence>
        <ct:startTime>2001-12-17T09:30:47Z</ct:startTime>
        <ct:duration>P1Y2M3DT10H30M</ct:duration>
    </ud:PeriodOfOccurrence>
    <ud:ActivityDescription>
        <ud:ActivityItem>running</ud:ActivityItem>
        <ud:MovingSpeed>35</ud:MovingSpeed>
        <ud:PhysicalState>
            <ud:Heartbeat>35</ud:Heartbeat>
            <ud:ECG>50</ud:ECG>
            <ud:RespirationRate>70</ud:RespirationRate>
        </ud:PhysicalState>
    </ud:ActivityDescription>
</ud:Activity>
```

2.26. IntentionType
The IntentionType describes the intention of the user.

2.26.1. Syntax

```
<complexType name="IntentionType">
    <sequence>
        <element name="IntentionDateTimeType" type="ct:TimeType" minOccurs="0"/>
        <element name="IntentionServiceType" type="sd:ServiceDescriptionType" minOccurs="0"/>
    </sequence>
    <attribute name="type">
        <simpleType>
            <restriction base="string">
                <enumeration value="going to"/>
            </restriction>
        </simpleType>
    </attribute>
</complexType>
```

2.26.2. Semantics

| Name | Definition |
| --- | --- |
| IntentionDateTimeType | This data describes time of an intention. |
| IntentionServiceType | Describes a service to be used by a user. |

<Appendix 2: Context Description>

1. Introduction
The following section includes a description of a schema used for describing a context.

2. Context description tools

2.1. ContextDescriptionType Data Type
This sub-clause describes a structure of a ContextDescriptionType data type. The ContextDescriptionType contains several elements, such as ValidTimeDuration, Season, DeviceCharacteristics, NetworkInfo, Location, Weather and OtherEnvironmentalInfo each of which is used for describing user's environmental information.

2.1.1. Syntax

```
<element name="CD" type="cd:ContextDescriptionType"/>
<complexType name="BaseContextType" abstract="true">
    <attribute name="InfoSource" type="anyURI"/>
</complexType>
<complexType name="ContextDescriptionType">
    <sequence minOccurs="0" maxOccurs="unbounded">
        <element name="ContextIdentification" type="cd:ContextIdentificationType" minOccurs="0"/>
        <element name="ValidTimeDuration" type="ct:TimeType" minOccurs="0"/>
        <element name="Season" type="cd:SeasonType" minOccurs="0"/>
        <element name="DeviceCharacteristics" type="cd:DeviceCharacteristicsType" minOccurs="0" maxOccurs="unbounded"/>
        <element name="NetworkInfo" type="cd:NetworkInfoType" minOccurs="0" maxOccurs="unbounded"/>
        <element name="Location" type="cd:LocationType" minOccurs="0"/>
        <element name="Weather" type="cd:WeatherType" minOccurs="0"/>
        <element name="OtherEnvironmentalInfo" type="cd:OtherEnvironmentalInfoType" minOccurs="0"/>
        <element name="Priority" type="ct:ZeroToOnehundredOrdinalType" minOccurs="0"/>
        <any namespace="##other" id="Information" minOccurs="0"/>
    </sequence>
    <attributeGroup ref="ct:commonAttributes"/>
</complexType>
```

2.1.2. Semantics
Semantics of the ContextDescriptionType:

| Name | Definition |
| --- | --- |
| CD | This data element is a root element of Context Description. |
| ContextDescriptionType | This data type contains static and dynamic information around a user. |
| ValidTimeDuration | Describes a valid time duration for context description. A syntax and semantics of PeriodOfTimeType are specified in Common Type (M32384). |

| Name | Definition |
| --- | --- |
| Season | Specifies a current season when a service is requested. |
| DeviceCharacteristics | Describes general characteristics of a terminal. |
| NetworkInfo | Describes network related information. |
| Location | Describes a current location when a service is requested. A syntax and semantics of PlaceType are specified in ISO/IEC 15938-5. |
| Weather | Describes current weather when a service is requested. |
| OtherEnvironmentalInfo | Describes environmental information of noise or illumination characteristics around a user. |
| Priority | Describes a priority of CD. |
| commonAttributes | Describes a group of attributes for commonAttributes. A syntax and semantics of commonAttributes are specified in Common Type (M32384). |

2.1.3. Examples

This example shows a ContextDescriptionType data type.

```
<CD userID="ID_2013710471">
    <cd:ValidTimeDuration>
        <ct:startTime>2014-01-03T09:00:00Z</ct:startTime>
        <ct:endTime>2014-01-03T10:00:00Z</ct:endTime>
    </cd:ValidTimeDuration>
    <cd:Season>winter</cd:Season>
    <cd:DeviceCharacteristics deviceID="Phone" inUse="true" availablity="true">
        <cd:DeviceCapability xsi:type="mpeg21:DisplaysType">
            <mpeg21:Display>
                <mpeg21:DisplayCapability xsi:type="mpeg21:DisplayCapabilityType">
                    <mpeg21:Mode>
                        <mpeg21:Resolution horizontal="720" vertical="480"/>
                    </mpeg21:Mode>
                </mpeg21:DisplayCapability>
            </mpeg21:Display>
        </cd:DeviceCapability>
        <cd:NetworkInterfaceUnit id="ID_2" minGuaranteed="32000" maxCapacity="384000"/>
    </cd:DeviceCharacteristics>
    <cd:Weather>
        <cd:Precipitation value="10.0" duration="1" formation="Snowflakes"/>
    </cd:Weather>
</CD>
```

2.2. ContexIdentificationType

This sub-clause describes a structure of ContextIdentificationType.

2.2.1. Syntax

```
<!--
###################################################################
-->
<!--    Definition of Context Identification type          -->
<!--
###################################################################
-->
<complexType name="ContextIdentificationType">
    <sequence>
        <element name="InstanceIdentifier" type="mpeg7:UniqueIDType"/>
        <element name="sessionID" type="URI"/>
    </sequence>
</complexType>
```

2.2.2. Semantics
Semantics of the ContextDescriptionType:

| Name | Definition |
| --- | --- |
| ContextIdentification | Complex type describing a context ID |
| InstanceIdentifier | An element describing an ID of a context |
| sessionID | An element describing a session ID used by a context |

2.3. SeasonType

The Season describes a current season which is defined as spring, summer, autumn, winter. Each season is divided by three categories, for example, early, middle, and late. Hence there are total 12 seasons.

2.3.1. Syntax

```
<simpleType name="SeasonType">
    <restriction base="string">
        <enumeration value="early spring"/>
        <enumeration value="spring"/>
        <enumeration value="late spring"/>
        <enumeration value="early summer"/>
        <enumeration value="summer"/>
        <enumeration value="late summer"/>
        <enumeration value="early autumn"/>
        <enumeration value="autumn"/>
        <enumeration value="late autumn"/>
        <enumeration value="early winter"/>
        <enumeration value="winter"/>
        <enumeration value="late winter"/>
    </restriction>
</simpleType>
```

2.3.2. Examples
This example indicates a winter season.
`<cd:Season>winter</cd:Season>`

2.4. DeviceCharacteristics

This sub-clauses describe a static and dynamic information of a device.

The information may include device information which does not change in time, unless a user intentionally change, such as a type of device, maker, network service provider, etc. Additionally, the information may include dynamic information such as a battery level, an available memory size, a CPU utilization level, and an available device's network unit.

2.4.1. Syntax

```
<complexType name="DeviceCharacteristicsType">
    <complexContent>
        <extension base="cd:BaseContextType">
            <sequence>
                <element name="DeviceCapability" type="mpeg21:TerminalCapabilityBaseType" minOccurs="0" maxOccurs="unbounded"/>
                <element name="NetworkInterfaceUnit" type="mpeg21:NetworkCapabilityType" minOccurs="0" maxOccurs="unbounded"/>
            </sequence>
            <attribute name="deviceID" type="ID" use="required"/>
            <attribute name="availablity" type="boolean" default="true"/>
            <attribute name="inUse" type="boolean" default="false"/>
            <attribute name="operatingSystem" type="string"/>
            <attribute name="version" type="string"/>
        </extension>
    </complexContent>
</complexType>
```

2.4.2. Semantics
Semantics of DeviceCharacteristicsType:

| Name | Definition |
|---|---|
| DeviceCharacteristicsType | This data type describes general characteristics of a terminal. |
| DeviceCapability | Describes capabilities of a terminal in terms of input-output capabilities and device properties. A syntax and semantics of TerminalCapabilityBaseType are specified in ISO/IEC 21000-7. |
| NetworkInterfaceUnit | Describes a device's network unit. A syntax and semantics of NetworkCapabilityType are specified in ISO/IEC 21000-7. |
| deviceID | Specifies an unique device identifier. |
| Availability | Specifies availability of a device. |
| inUse | Specifies whether a device is currently in use. |
| operatingSystem | Describes an operating system used by a device |
| Version | Describes a version of an operating system/device |

2.4.3. Examples

This example describes a terminal's display resolution that 720×480 using mpeg-21:DisplaysType. Also this description indicates that a maximum capacity of 384 kbps and a minimum guaranteed bandwidth of 32 kbps.

```
<cd:DeviceCapability xsi:type="mpeg21:DisplaysType">
    <mpeg21:Display>
        <mpeg21:DisplayCapability xsi:type="mpeg21:DisplayCapabilityType">
            <mpeg21:Mode>
                <mpeg21:Resolution horizontal="720" vertical="480"/>
            </mpeg21:Mode>
        </mpeg21:DisplayCapability>
    </mpeg21:Display>
</cd:DeviceCapability>
<cd:NetworkInterfaceUnit id="ID_5" minGuaranteed="32000" maxCapacity="384000"/>
</cd:DeviceCharacteristics>
```

2.5. NetworkInfoType

This sub-clause describes a structure of a NetworkInfo element. NetworkInfoType describes a static and dynamic information of an available network around a user.

2.5.1. Syntax

```
<complexType name="NetworkInfoType">
    <complexContent>
        <extension base="cd:BaseContextType">
            <sequence>
                <element name="NetworkCapability" type="mpeg21:NetworkCapabilityType"/>
                <element name="NetworkCondition" type="mpeg21:NetworkConditionType"/>
            </sequence>
            <attribute name="networkID" type="ID"/>
            <attribute name="InUse" type="boolean"/>
        </extension>
    </complexContent>
</complexType>
```

2.5.2. Semantics
Semantics of the NetworkInfoType:

| Name | Definition |
|---|---|
| NetworkInfoType | This data type describes static and dynamic information of a network around a user. |
| NetworkCapability | Describes static information of network around a user. A syntax and semantics of NetworkCapabilityType are specified in ISO/IEC 21000-7. |
| NetworkCondition | Describes dynamic information for a network around a user. A syntax and semantics of NetworkConditionType are specified in ISO/IEC 21000-7. |
| Networked | Specifies a unique network identifier. |
| InUse | Specifies whether a device is currently in use. |

2.5.3. Examples

This example describes a network that is characterized by a maximum capacity of 384 kbps and a minimum guaranteed bandwidth of 32 kbps. This description indicates that a maximum bandwidth achieved was 256 kbps and an average over that time was 80 kbps.

```
<cd:NetworkInfo networkID="wifi_1" InUse="true">
    <cd:NetworkCapability
        xsi:type="mpeg21:NetworkCapabilityType"
        minGuaranteed="32000" maxCapacity="384000"/>
    <cd:NetworkCondition
        xsi:type="mpeg21:NetworkConditionType"
        duration="PT330N1000F">
        <mpeg21:AvailableBandwidth average="80000" maximum="256000"/>
        <mpeg21:Delay packetTwoWay="330" delayVariation="66"/>
        <mpeg21:Error packetLossRate="0.05"/>
    </cd:NetworkCondition>
</cd:NetworkInfo>
```

2.6. LocationType

This sub-clause describes a structure of a Location element. Location includes Location and SemanticLocation elements.

2.6.1. Syntax

```
<complexType name="LocationType">
    <sequence>
        <element name="Location" type="mpeg7:PlaceType" minOccurs="0"/>
        <element name="SemanticLocation" type="mpeg7:SemanticPlaceType" minOccurs="0"/>
    </sequence>
</complexType>
```

2.6.2. Semantics

Semantics of the LocationType:

| Name | Definition |
|---|---|
| LocationType | This data type represents a geographical and semantic location of a user. |
| Location | Describes a user's geographical location. |
| SemanticLocation | Describes a semantic location of a user. |

2.6.3. Examples

This example indicated use of Location. In this case, the place is a university in Madrid, Spain.

```
<cd:Location>
    <mpeg7:Name xml:lang="en">Madrid</mpeg7:Name>
    <mpeg7:GeographicPosition datum="itrf">
        <mpeg7:Point latitude="35.5" longitude="135.75" altitude="100"/>
    </mpeg7:GeographicPosition>
    <mpeg7:AdministrativeUnit type="city">Madrid</mpeg7:AdministrativeUnit>
    <mpeg7:PostalAddress>
        <mpeg7:AddressLine>E.T.S.Ing. Telecommunication</mpeg7:AddressLine>
        <mpeg7:AddressLine>Universidad Politecnica de Madrid</mpeg7:AddressLine>
        <mpeg7:AddressLine>Ciudad Universitaria s/n</mpeg7:AddressLine>
        <mpeg7:PostingIdentifier>E-2804</mpeg7:PostingIdentifier>
    </mpeg7:PostalAddress>
    <mpeg7:InternalCoordinates>C-306</mpeg7:InternalCoordinates>
</cd:Location>
```

2.7. WeatherType

This sub-clause describes a structure of a weather element. WeatherType includes Temperature, Precipitation, wind and Humidity elements.

2.7.1. Syntax

```
<complexType name="WeatherType">
    <complexContent>
        <extension base="cd:BaseContextType">
            <sequence>
                <element name="Temperature" type="mpegVsiv:TemperatureSensorType" minOccurs="0"/>
                <element name="Precipitation" minOccurs="0">
                    <complexType>
                        <attribute name="value" type="float"/>
                        <attribute name="valueUnit" type="mpegVct:unitType"/>
                        <attribute name="duration" type="integer"/>
                        <attribute name="durationUnit" type="mpegVct:unitType"/>
                        <attribute name="formation">
                            <simpleType>
                                <restriction base="string">
                                    <enumeration value="Raindrops"/>
                                    <enumeration value="Ice pellets"/>
                                    <enumeration value="Hail"/>
                                    <enumeration value="Snowflakes"/>
                                </restriction>
                            </simpleType>
                        </attribute>
                    </complexType>
                </element>
                <element name="Wind" minOccurs="0">
                    <complexType>
                        <complexContent>
                            <extension base="mpegVsiv:VelocitySensorType">
                                <attribute name="direction" type="mpeg7:termReferenceType"/>
                            </extension>
                        </complexContent>
                    </complexType>
                </element>
                <element name="Humidity" type="mpegVsiv:HumiditySensorType" minOccurs="0"/>
            </sequence>
        </extension>
    </complexContent>
</complexType>
```

2.7.2. Semantics

Semantics of the WeatherType:

| Name | Definition |
|---|---|
| Precipitation | Describes precipitation during a specified period of time as defined by a duration attribute in a default unit of millimeter or in a unit specified by a valueUnit attribute. |
| Value | Specifies precipitation in a default unit of millimeter or in a unit specified by a valueUnit attribute. |

-continued

| Name | Definition |
|---|---|
| valueUnit | Specifies a unit of a precipitation value, if a unit other than a default unit is used, as a reference to a classification scheme term provided by UnitTypeCS defined in A.2.1 of ISO/IEC 23005-6 using the mpeg7:termReferenceType defined in 7.6 of ISO/IEC 15938-5. |
| Duration | Specifies a time period up to a time of measuring precipitation in a default unit of hour or in a unit specified by a durationUnit attribute. |
| durationUnit | Specifies a unit of a duration, if a unit other than a default unit is used, as a reference to a classification scheme term provided by UnitTypeCS defined in A.2.1 of ISO/IEC 23005-6 using the mpeg7:termReferenceType defined in 7.6 of ISO/IEC 15938-5. |
| Formation | Specifies a formation of precipitation. |
| Wind | Describes a strength and direction of wind. A syntax and semantics of VelocitySensorType are specified in ISO/IEC 23005-5. |
| Direction | Specifies a direction of wind coming from, as a reference to a classification scheme term provided by WindDirectionTypeCS defined in Annex B.8 using the mpeg7:termReferenceType defined in 7.6 of ISO/IEC 15938-5. |
| Humidity | Describes humidity. A syntax and semantics of HumiditySensorType are specified in ISO/IEC 23005-5. |

2.7.3. Examples

This example indicates a snowing 10 centimeter per hour.

```
<cd:Weather>
    <cd:Precipitation value="10.0" valueUnit="centimeter"
        duration="1"
    formation="Snowflakes"/>
</cd:Weather>
```

2.8. OtherEnvironmentalInfo

This sub-clause describes a structure of an OtherEnvironmentalInfo element. OtherEnvironmentalInfoType includes AudioEnvironment and IlluminationCharacteristicsics elements.

2.8.1. Syntax

```
<complexType name="OtherEnvironmentalInfoType">
    <complexContent>
        <extension base="cd:BaseContextType">
            <sequence>
                <element name="AudioEnvironment"
type="mpeg21:AudioEnvironmentType" minOccurs="0"/>
                <element
name="IlluminationCharacteristics"
type="mpeg21:IlluminationCharacteristicsType"
minOccurs="0"/>
            </sequence>
        </extension>
    </complexContent>
</complexType>
```

2.8.2. Semantics

Semantics of the OtherEnvironmentalInfoType:

| Name | Definition |
|---|---|
| OtherEnvironmentalInfoType | Describes characteristics that pertain to audio-visual aspects. |
| AudioEnvironment | Describes a natural audio environment of a particular user. A syntax and semantics of AudioEnvironmentType are specified in ISO/IEC 21000-7. |
| IlluminationCharacteristics | Describes overall illumination characteristics of a natural environment. A syntax and semantics of IlluminationCharacteristicsType are specified in ISO/IEC 21000-7. |

2.8.3. Examples

This example describes AudioEnvironment and IlluminationCharacteristics. AudioEnvironment indicates that an environmental noise level is 20 dB. IlluminationCharacteristics indicates a correlated color temperature.

```
<cd:OtherEnvironmentalInfo>
    <cd:AudioEnvironment>
        <mpeg21:NoiseLevel>20</mpeg21:NoiseLevel>
        <mpeg21:NoiseFrequencySpectrum>
            40 30 20 10 10 10 10 10 10
            10 40 40 40 30 30 30 20 20 20
            10 10 10 10 10 10 10 10 10 10
            10 10 10
        </mpeg21:NoiseFrequencySpectrum>
    </cd:AudioEnvironment>
</cd:OtherEnvironmentalInfo>
<cd:OtherEnvironmentalInfo>
    <cd:IlluminationCharacteristics>
        <mpeg21:TypeOfIllumination>
        <mpeg21:ColorTemperature>159</mpeg21:ColorTemperature>
        </mpeg21:TypeOfIllumination>
        <mpeg21:Illuminance>500</mpeg21:Illuminance>
    </cd:IlluminationCharacteristics>
</cd:OtherEnvironmentalInfo>
```

<Appendix 3: Service Description>

DecisionModelType in Service Description (SD)

It might be an ultimate purpose of a service provider that users are satisfied with its service and aware of its intention efficiently. We provide a decision making model to describe an intention of a specific service provider. Decision making can be regarded as a cognitive process resulting in a selection of a course of action among several alternative scenarios. Every decision making process produces a final choice which can be an action or an opinion of choice [1]. Each service provider has own domain knowledge about every phase of its business, and needs to make distinct strategies to try to develop into a highly profitable business. For this, it might be important for a service provider to segment users considering usage data and a statistical analysis of users for providing target services.

First of all, we propose an approach that describes a decision tree to represent a decision making model in this document. As mentioned in an earlier document [2], we propose a structure of an SD and the second part in the SD is a service target description. Since one of purposes of a recommended description (RD) is to suggest a proper service according to a user's intention, the SD shall describe its service target in its description. In this element, we newly define a DecisionModel child element which includes information about a decision model uniquely made by a specific service provider.

Syntax

```
<element name="DecisionModel" minOccurs="0"
    type="sd:DecisionModelType"
maxOccurs="unbounded"/>
    <complexType name="DecisionModelType">
        <sequence>
```

41
-continued

```
        <element name="DecisionTree" minOccurs="0"
maxOccurs="unbounded">
                <complexType>
                        <attribute name="userType" type="token"
use="required"/>
                </complexType>
        </element>
        <element name="UserTypeSet"
type="sd:VocabularySetType">
                <unique name="userType-vocabulary">
                        <selector xpath="sd:vocabulary"/>
                        <field xpath="@name"/>
                </unique>
        </element>
        </sequence>
</complexType>
<complexType name="VocabularySetType">
        <sequence>
                <element name="vocabulary" maxOccurs="unbounded">
                        <complexType>
                                <attribute name="name" type="NMTOKEN"
use="required"/>
                        </complexType>
                </element>
        </sequence>
        <attribute name="id" type="ID" use="required"/>
</complexType>
```

Semantics

Semantics of the DecisionModel:

| Name | Definition |
| --- | --- |
| DecisionModel | Describes a decision model which has an informational role of user segmentation. |
| DecisionModelType | Describes a decision model for each user type and defines a vocabularies set of a user type. |
| DecisionTree | Describes a decision tree model representing a specific user type. (TBC) |
| userType | Indicates a specific user type related to a decision tree. |
| UserTypeSet | Describes a set of user-type vocabularies. Only vocabulary names defined in a declared user type set of a given element can be used for representations of userType. |

Example

```
<sd:ServiceTargetInformation>
<sd:Decision Model>
        <sd:DecisionTree userType="UserType_1">
                <!-- UserType 1 modeling -->
        </sd:DecisionTree>
        <sd:UserTypeSet id="ID_UserTypeSet1" >
                <sd:vocabulary name="UserType_1"/>
                <sd:vocabulary name="UserType_2"/>
                <sd:vocabulary name="UserType_3"/>
                <sd:vocabulary name="UserType_4"/>
        </sd:UserTypeSet>
</sd:DecisionModel>
<sd:DecisionModel>
        <sd:UserTypeSet id="ID_InclinationOfPolitics">
                <sd:vocabulary name="progressiveTendency"/>
                <sd:vocabulary name="conservativeTendency"/>
        </sd:UserTypeSet>
</sd:DecisionModel>
</sd:ServiceTargetInformation>
```

42

<Appendix 4: Recommendation Description>

UserType Description in Recommendation Description (RD)

The type and tendency information about a user can be described in an RD. This information can be obtained from an RD engine. There are two ways to take user type information. The first way to take related data is to get results from an RD engine using a UD and a CD directly. In this case, the RD engine should have an inference module to analyze a context of a user. However, it is not easy to develop an inference engine providing the best solution for every case and every application. The second way is just to interpret rules and relations of an SD using contexts of the UD and the CD. After that, a proper user type may be found and transmitted to an application. The first requirement for this case is that an RD engine can analyze a rule of decision tree description in the SD. A proper user type can be found using user's contexts in the UD and the CD and easily compatible with applications. In this case, the RD engine needs not to have an ability to deduce.

Syntax

```
<element name="RD" type="ud:recommendationDescriptionType"/>
<complexType name="recommendationDescriptionType">
        <sequence>
                <element name="CompactUsageDescription"
type="rd:compactUsageDescriptionType" minOccurs="0"
maxOccurs="unbounded"/>
                <element name="QueryDescription"
type="rd:queryDescriptionType" minOccurs="0"
maxOccurs="unbounded"/>
                <element name="userType" type="NMTOKEN"
                        minOccurs="0"
maxOccurs="unbounded"/>
        </sequence>
        <attributeGroup ref="ct:commonAttributes"/>
</complexType>
<complexType name="compactUsageDescriptionType"/>
<complexType name="queryDescriptionType"/>
```

Semantics

| Name | Definition |
| --- | --- |
| commonAttributes | Indicates properties of each sub-element. |
| userType | Indicates userType for a specific service. |

Example

```
<rd:RD userID="ID_1">
        <rd:CompactUsageDescription/>
        <rd:QueryDescription/>
        <rd:userType>UserType_4</rd:userType>
        <rd:userType>conservativeTendency</rd:userType>
</rd:RD>
```

What is claimed is:

1. A method for receiving a context based service, the method comprising:
providing a user identifier (ID), from a user terminal, to a service provider
providing the user ID from the service provider to a recommendation engine, the user ID being used for a recommendation of a service by the recommendation engine using a decision model;
generating, by the recommendation engine, a recommendation description (RD) and a user type by analyzing a decision tree in the decision model based on at least one of a user description (UD) and a context description (CD); and receiving, by the user terminal, a recommended service from the service provider, the recommended service being recommended through the RD which is determined by the recommendation engine based on the decision model and at least one of the UD and the CD being obtained through the user ID, the RD being provided to the service provider, wherein the decision model is predefined by the service provider and is used by the recommendation engine, and defines a set of user types classified for a service strategy and the user type included in the RD, and wherein the receiving the recommended service from the service provider comprises:

checking whether a service description (SD) exists, the SD defining a service provided by a service engine and including the decision model associated with the service, and the decision model including the decision tree which represents a user type and a set of user type which includes a plurality of user types;

obtaining at least one of the UD and the CD based on the user ID;

determining the user type of the set of user type in the decision model based on the at least one of the UD and the CD obtained by interpreting the decision tree in the decision model; and determining the RD which includes the user type, wherein the service provider and recommendation engine are configured as separate devices.

2. The method of claim 1, wherein the user ID is provided to a manager before at least one of the UD and the CD is obtained through the user ID.

3. The method of claim 2, wherein the recommended service is determined based on the service description (SD) which is provided by the service provider to the recommendation engine and comprises the decision model and wherein the recommended service is one of services that are provided by the service engine.

4. The method of claim 1, wherein the decision model includes the decision tree used by the recommendation engine and representing a specific user type.

5. The method of claim 1, wherein the decision model defines a plurality of user type sets being used by the recommendation engine and wherein the user type is non-exclusively included in the plurality of the user type sets.

6. A method for providing a context based service, the method comprising:

preparing a decision model, by a service engine, the decision model being used for a recommendation of a service by a recommendation engine;

generating, by the recommendation engine, a recommendation description (RD) and a user type by analyzing a decision tree in the decision model based on at least one of a user description (UD) and a context description (CD); and providing a recommended service to a user terminal when the recommendation of the service is requested from the user terminal, the recommendation service being recommended through the RD which is determined by the recommendation engine based on the decision model and at least one of the UD and the CD being obtained through a user identifier (ID), wherein the decision model is predefined by a service provider and is used by the recommendation engine, and defines a set of user types classified for a service strategy and the user type included in the RD, and wherein the providing the recommended service to the user terminal comprises:

providing the user ID and the decision model to the recommendation engine;

checking, by the recommendation engine, whether a service description (SD) exists, the SD defining a service provided by the service engine and including the decision model associated with the service, and the decision model including the decision tree which represents a user type and a set of user type which includes a plurality of user types;

obtaining, by the recommendation engine, at least one of the UD and the CD based on the user ID;

determining, by the recommendation engine, the user type of the set of user type in the decision model based on the obtained description by interpreting the decision tree in the decision model; and determining, by the recommendation engine, the RD which includes the user type, wherein the service engine and recommendation engine are configured as separate devices.

7. The method of claim 6, wherein the user ID is provided from the user terminal to a manager before at least one of the UD and the CD is obtained through the user ID.

8. The method of claim 7, wherein the recommended service is determined based on the service description (SD) which is provided by the service engine and comprises the decision model and wherein the recommended service is one of services that are provided by the service engine.

9. The method of claim 6, wherein the providing the recommended service to the user terminal comprises:

receiving the user ID from the user terminal;

providing the user ID and the decision model to the recommendation engine; and providing the RD to the user terminal by the recommendation engine based on the decision model and at least one of the user description and the context description, wherein the RD comprises the user type in the decision model.

10. The method of claim 9, wherein the providing the recommended service to the user terminal further comprises supporting a determination of the user type by the recommendation engine according to the decision tree of the decision model.

11. The method of claim 10, wherein the providing the recommended service to the user terminal further includes checking whether the recommendation engine already has the decision model when the decision model is provided to the recommendation engine.

12. The method of claim 9, wherein providing the recommended service to the user terminal comprises determining the recommended service provided to the user terminal based on the recommendation description.

13. A method for generating a context based service, the method comprising:

receiving, by a recommendation engine, a decision model used for determining a service to be provided from a service engine; and generating, by the recommendation engine, a recommendation description (RD) and a user type by analyzing a decision tree in the decision model based on at least one of a user description (UD) and a context description (CD);

providing the generated RD to the service engine; and providing a recommended service from the service engine to a user terminal based on the generated RD, wherein the decision model is predefined by a service provider and is used by the recommendation engine, and defines a set of user types classified for a service strategy and the user type included in the RD, and wherein the generating the RD comprises:

checking whether a service description (SD) exists, the SD defining a service provided by the service engine and including the decision model associated with the service, and the decision model including the decision tree which represents a user type and a set of user type which includes a plurality of user types;

obtaining at least one of the UD and the CD based on a user identifier (ID) provided from the user terminal;

determining the user type of the set of user type in the decision model based on the obtained description by interpreting the decision tree in the decision model; and generating the RD which includes the user type, wherein the service engine and recommendation engine are configured as separate devices.

14. The method of claim 13, wherein the generating the RD comprises deducing at least one of the UD and the CD through a user context being provided by a user terminal.

15. The method of claim 13, wherein the generating the RD includes providing at least one of the UD and the CD from a user-context description provider through a user ID.

\* \* \* \* \*